US012796627B2

(12) United States Patent
Gardinier

(10) Patent No.: US 12,796,627 B2
(45) Date of Patent: Nov. 17, 2026

(54) PLANT BEDDING SYSTEM AND METHOD FOR PLANT AGRICULTURE

(71) Applicant: Jardin Holdings I, LLC, Sarasota, FL (US)

(72) Inventor: Stephane Gardinier, Sarasota, FL (US)

(73) Assignee: Jardin Holdings I, LLC, Sarasota, FL (US)

( * ) Notice: Subject to any disclaimer, the term of this patent is extended or adjusted under 35 U.S.C. 154(b) by 284 days.

(21) Appl. No.: 18/786,384

(22) Filed: Jul. 26, 2024

(65) Prior Publication Data

US 2025/0031592 A1 Jan. 30, 2025

Related U.S. Application Data

(60) Provisional application No. 63/516,390, filed on Jul. 28, 2023.

(51) Int. Cl.

| | |
|---|---|
| ***A01B 49/04*** | (2006.01) |
| ***A01G 13/29*** | (2025.01) |
| ***A01G 13/37*** | (2025.01) |

(52) U.S. Cl.

CPC .............. *A01G 13/37* (2025.01); *A01B 49/04* (2013.01); *A01G 13/29* (2025.01)

(58) Field of Classification Search

CPC .......... A01G 9/28; A01G 13/00; A01G 13/02; A01G 13/29; A01G 13/33; A01G 13/37; A01B 49/04; A01B 49/027; A01D 13/00; A01D 13/02

See application file for complete search history.

(56) References Cited

U.S. PATENT DOCUMENTS

| | | | | |
|---|---|---|---|---|
| 3,121,973 A * | 2/1964 | Phillips | A01G 13/37 | 172/50 |
| 3,180,290 A * | 4/1965 | Kappelmann | A01C 5/066 | 47/9 |
| 3,184,889 A * | 5/1965 | Gray | A01G 13/37 | 47/9 |
| 3,293,797 A * | 12/1966 | Oscar | A01G 13/37 | 47/9 |

(Continued)

FOREIGN PATENT DOCUMENTS

| | | |
|---|---|---|
| CN | 103460844 | 12/2013 |
| CN | 204408902 | 6/2015 |

(Continued)

OTHER PUBLICATIONS

International Search Report from the International Searching Authority for PCT/US2024/039926 mailed Oct. 21, 2024.

(Continued)

*Primary Examiner* — Adam J Behrens

(74) *Attorney, Agent, or Firm* — McHale & Slavin, P.A.

(57) ABSTRACT

A system and method for plant agriculture. The system includes a sheet of barrier material upon which soil is placed. A drip tube is placed in the soil so that the soil can be shaped, and the sheet material is placed over the top of the soil so that the edges of the sheet overlap. A seal, which may be soil, is placed on the overlapping edges of the sheet to hold the sheet material in a closed position. The crop is planted through the sheet material, and growth occurs through the aperture created during planting.

15 Claims, 40 Drawing Sheets

(56) References Cited

U.S. PATENT DOCUMENTS

| | | | | | |
|---|---|---|---|---|---|
| 3,559,599 | A * | 2/1971 | Hoadley | A01G 13/37 | 47/29.1 |
| 4,092,936 | A * | 6/1978 | Griffin | A01G 13/37 | 405/176 |
| 4,285,161 | A * | 8/1981 | Kawasaki | A01G 13/37 | 47/9 |
| 4,513,530 | A * | 4/1985 | Nyboer | A01G 13/37 | 47/9 |
| 4,886,002 | A * | 12/1989 | Scudellaro | A01C 11/02 | 111/102 |
| 5,070,641 | A * | 12/1991 | Brockington | A01G 13/33 | 47/9 |
| 5,226,376 | A * | 7/1993 | Shaw | A01G 13/37 | 111/144 |
| 5,526,759 | A * | 6/1996 | Cox | A01K 5/01 | 119/51.01 |
| 6,094,858 | A * | 8/2000 | Shine | A01G 13/37 | 47/1.01 R |
| 11,297,752 | B2 * | 4/2022 | Kishimoto | A01B 49/02 | |
| 2004/0194373 | A1 * | 10/2004 | Fraleigh | A01B 49/04 | 47/58.1 R |
| 2005/0198895 | A1 * | 9/2005 | Rose | A01G 13/37 | 47/9 |
| 2019/0364716 | A1 * | 12/2019 | Kishimoto | A01B 49/02 | |
| 2020/0170198 | A1 * | 6/2020 | Gardinier | A01G 13/33 | |

FOREIGN PATENT DOCUMENTS

| | | |
|---|---|---|
| CN | 107950330 | 4/2018 |
| CN | 210352127 | 4/2020 |

OTHER PUBLICATIONS

Written Opinion of the International Searching Authority for PCT/US2024/039926 mailed Oct. 21, 2024.

* cited by examiner

PLANT BEDDING SYSTEM AND METHOD FOR PLANT AGRICULTURE

RELATED APPLICATIONS

In accordance with 37 C.F.R 1.76, a claim of priority is included in an Application Data Sheet filed concurrently herewith. Accordingly, under 35 U.S.C. § 119 (e), 120, 121, and/or 365(c) the present invention claims priority of U.S. Patent Application No. 63/516,390, entitled "PLANT BEDDING SYSTEM AND METHOD FOR PLANT AGRICULTURE", filed on Jul. 28, 2023. The contents of each of the above referenced applications are herein incorporated by reference in its entirety.

FIELD OF INVENTION

The present invention generally relates to agriculture and, more particularly, to a plant agriculture system and method of growing plants to maximize yield while reducing water usage and chemical runoff.

BACKGROUND INFORMATION

Plant agriculture is defined as any plant, or part thereof, grown, maintained, or otherwise produced for commercial purposes, including growing, maintaining, or otherwise producing plants for sale or trade, for research or experimental purposes, or for use in part or in their entirety in another location. Plant agriculture is always concerned with improving production and reducing any harmful effects resulting from use of the land to grow plants.

The water in brooks, streams and creeks around the world carry a heavy load of nitrates from fertilizers used for plant agriculture. These nitrates eventually make their way downstream to rivers, lakes and oceans, carrying the nitrogen and oxygen from the nitrates and fertilizing blooms of algae that deplete oxygen in the water, often endangering fish and wildlife. Typically, bacteria in the water remove the excess fertilizer from the water through a chemical process known as de-nitrification, which enables the bacteria to convert the nitrate to nitrogen that is released to the atmosphere as a gas.

Over-fertilization is a leading cause of fertilizer (nitrate) runoff. Over-fertilization occurs when more nutrients are added to the soil than the plants can utilize; unused nutrients are then carried away by irrigation or rain water. Several factors can result in over-fertilization. It can be difficult to determine the nutrient content of some organic fertilizers; as a result, excess nutrients may exceed the estimated content. Farmers may also misdiagnose poor plant growth as a nutrient deficiency, and add fertilizer as a corrective measure.

Improper irrigation and control of water runoff is another cause of problems related to fertilizer runoff. Unfortunately, water control from large farm fields is nearly impossible due to weather, which may drop large amounts of water in a short period. The water follows the natural contours of the land to reach ditches, streams and creeks which flow further downstream to the larger bodies of water until flow reaches the ocean.

Potential solutions to the problems are difficult to implement. We could quit growing crops such as corn, which is used for fuel and feed for animals. Alternatively, we could quit fertilizing fields and them treating with herbicides and pesticides. However, neither of these approaches is practical or realistic given the amount of food that must be produced per acre of land to feed the people of the world.

Therefore, what is needed is a system and method of farming that not only reduces runoff but also reduces the need for water, pesticides and herbicides, and will produce at least as much food per acre as the present methods. The system should be relatively easy to implement in order to achieve acceptance by the end user. The system must be easily and quickly assembled using minimal equipment and requiring a minimal number of persons.

Thus, the present invention provides a system and method of plant agriculture which overcomes the disadvantages of prior art systems. The system and method of plant agriculture of the present invention not only provides for relative ease in the assembly and use, it also permits reduction in the amount of water necessary for proper plant production. The present invention also reduces the amount of herbicides and pesticides needed, thereby reducing the amount of undesired runoff of chemicals that cause problems with algae blooms and the like.

SUMMARY OF THE INVENTION

Briefly, the invention involves a system and method for plant agriculture. The system includes a sheet of barrier material upon which soil is placed. A drip tube is placed in the soil so that the soil can be shaped, and the sheet material is folded over the top of the soil so that the edges of the sheet overlap. A seal, which may be soil, is placed on the overlapping edges of the sheet to hold the sheet material in a closed position. The crop is planted through the sheet material, and growth occurs through apertures created during planting.

Accordingly, it is an objective of the present invention to provide a system and method of plant agriculture.

It is a further objective of the present invention to provide a system and method of plant agriculture that reduces water requirements for plant growth.

It is yet a further objective of the present invention to provide a system and method of plant agriculture that reduces runoff of water, including chemicals and leaching of chemicals into soil proximate plant growth.

It is another objective of the present invention to provide a plant agriculture system that reduces the need for chemical application to the soil by application of the chemicals to a sheet material which provides a barrier to adjacent soil.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

DETAILED DESCRIPTION OF THE PREFERRED EMBODIMENTS

Figure 1:
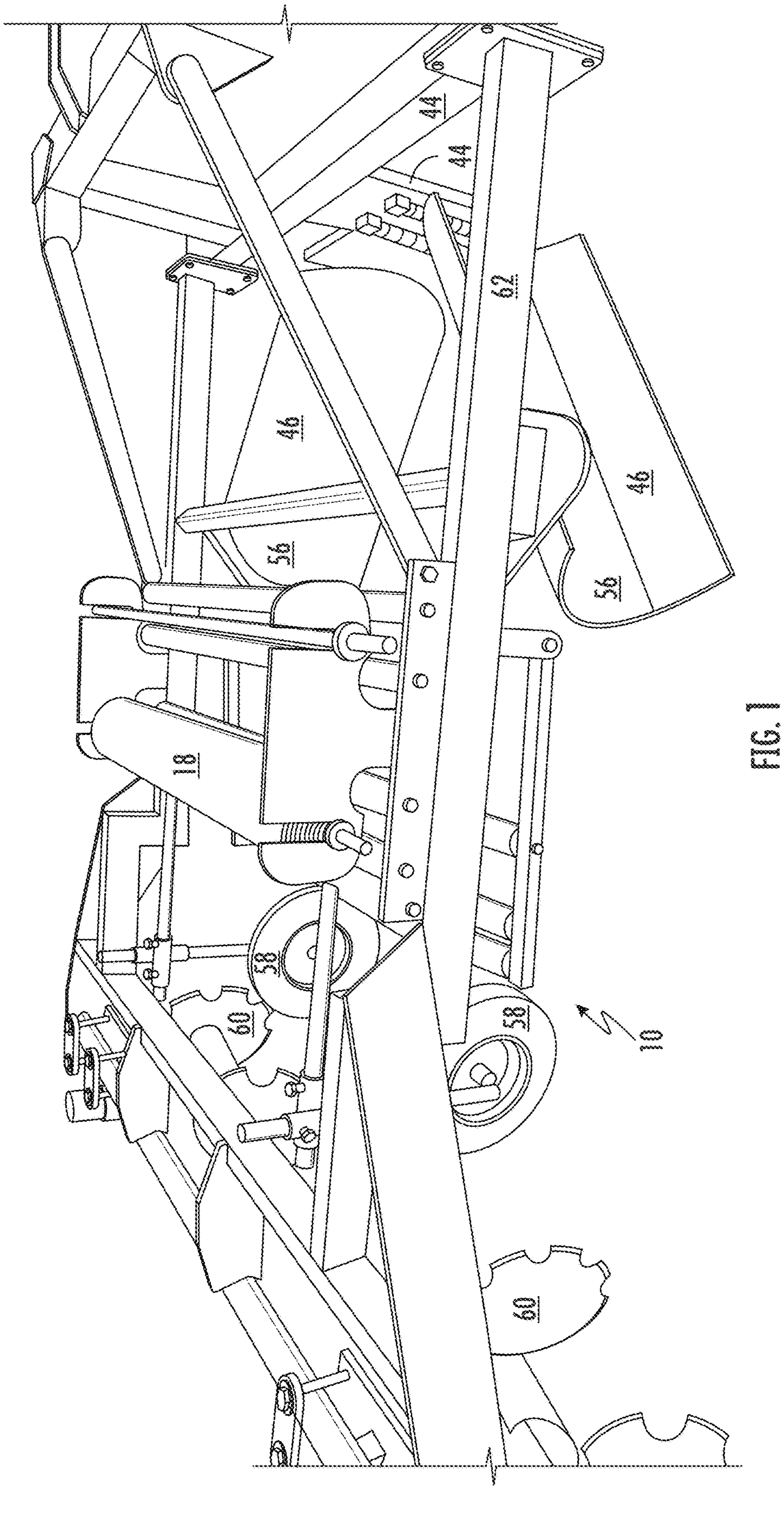
FIG. 1 is a partial top perspective view of a bed trencher of the present system.
Figure 2:
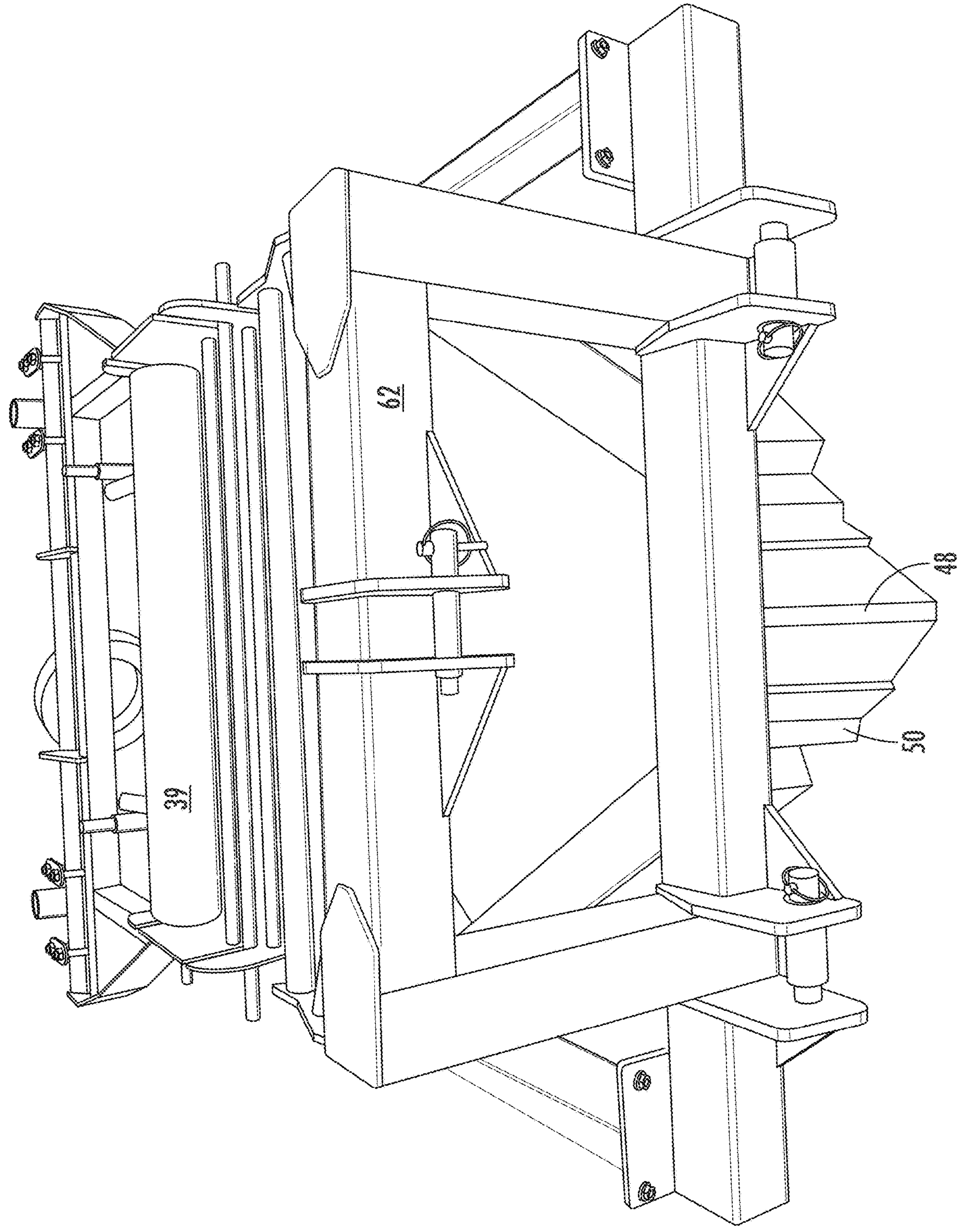
FIG. 2 is a front top perspective view of the bed trencher of the present system.
Figure 3:
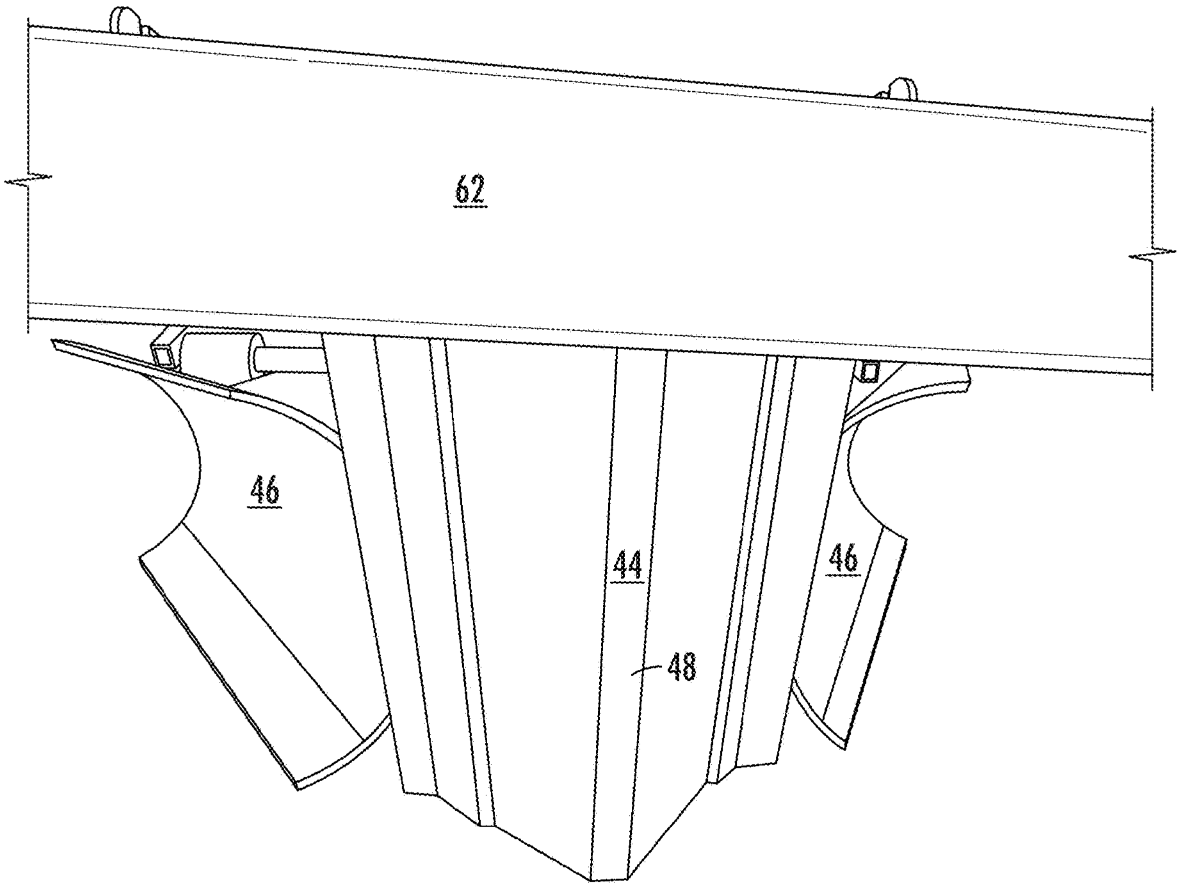
FIG. 3 is a partial front view of the bed trencher.
Figure 4:
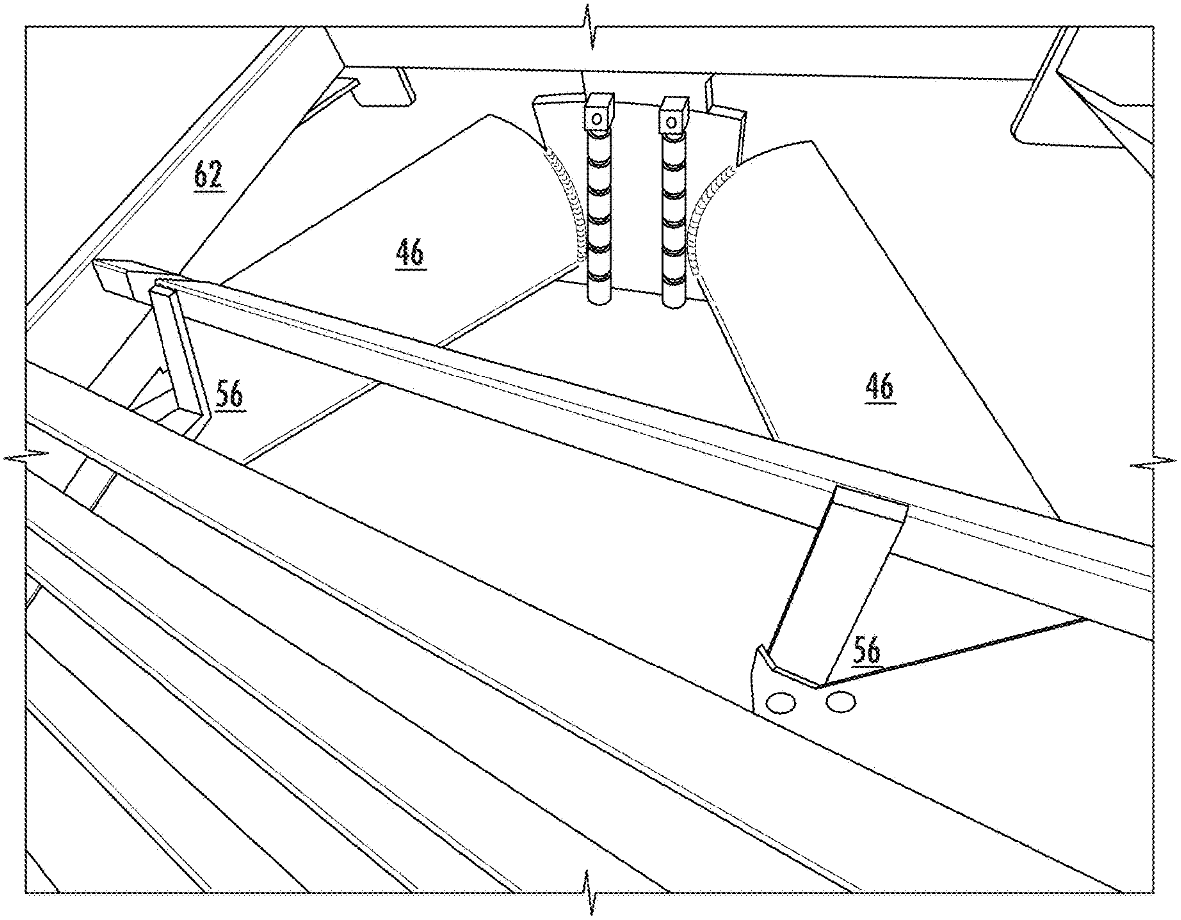
FIG. 4 is a partial top perspective view of the bed trencher, illustrating the splitter blades of the present system.
Figure 5:
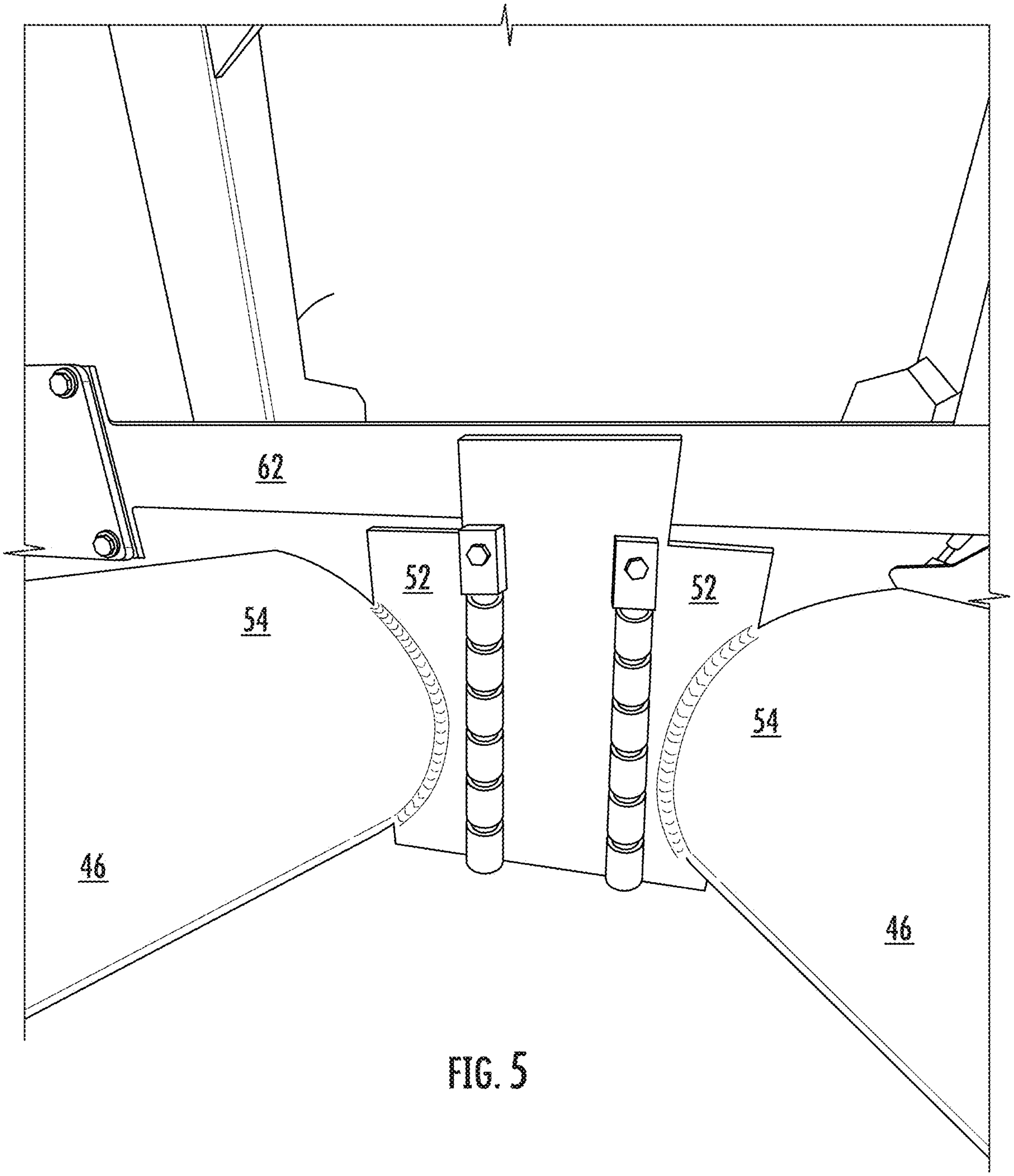
FIG. 5 is a partial rear view, illustrating the splitter blade hinges and the rear of the splitter point.
Figure 6:
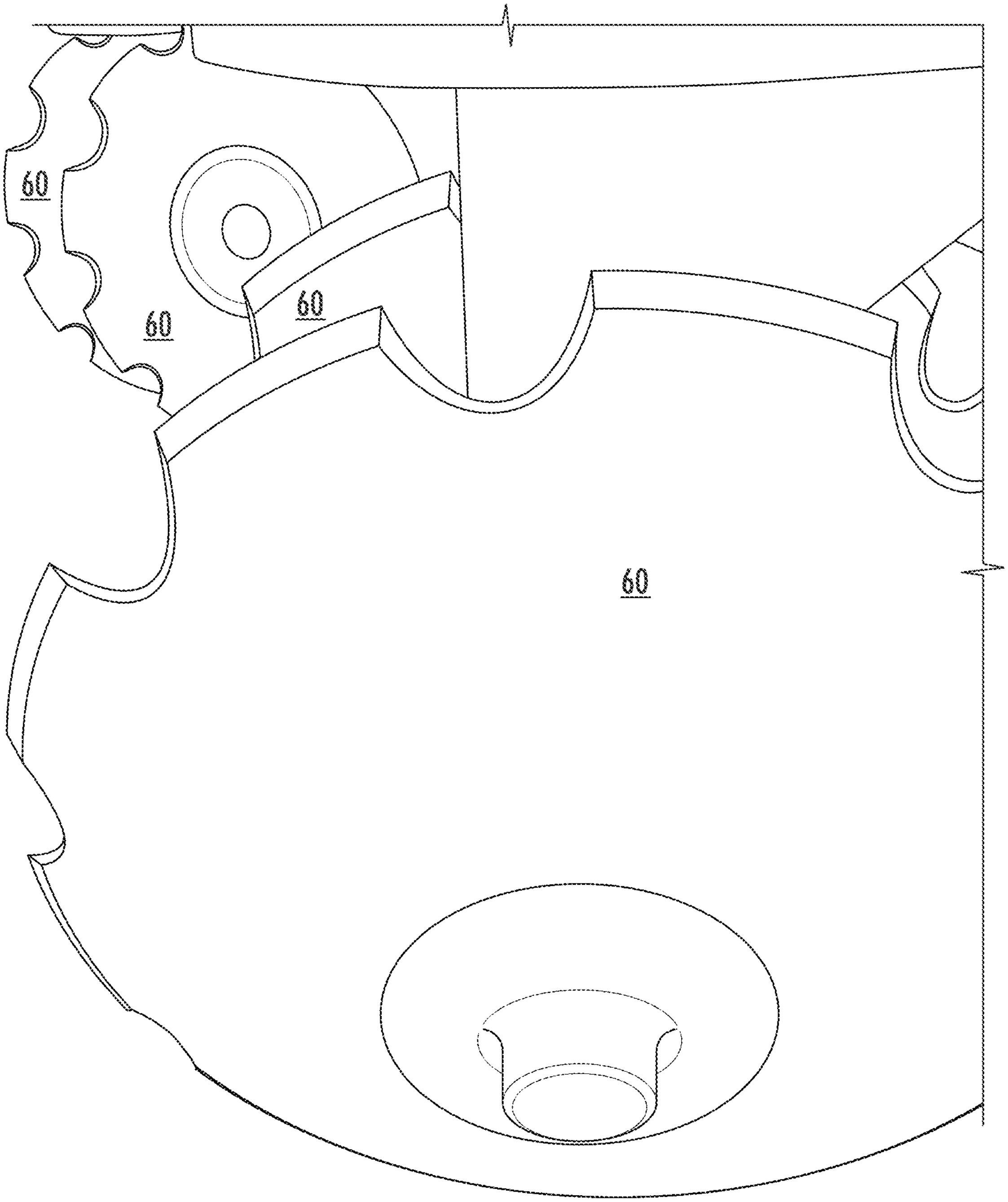
FIG. 6 is a partial side view of the bedding discs of the present system.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 40:
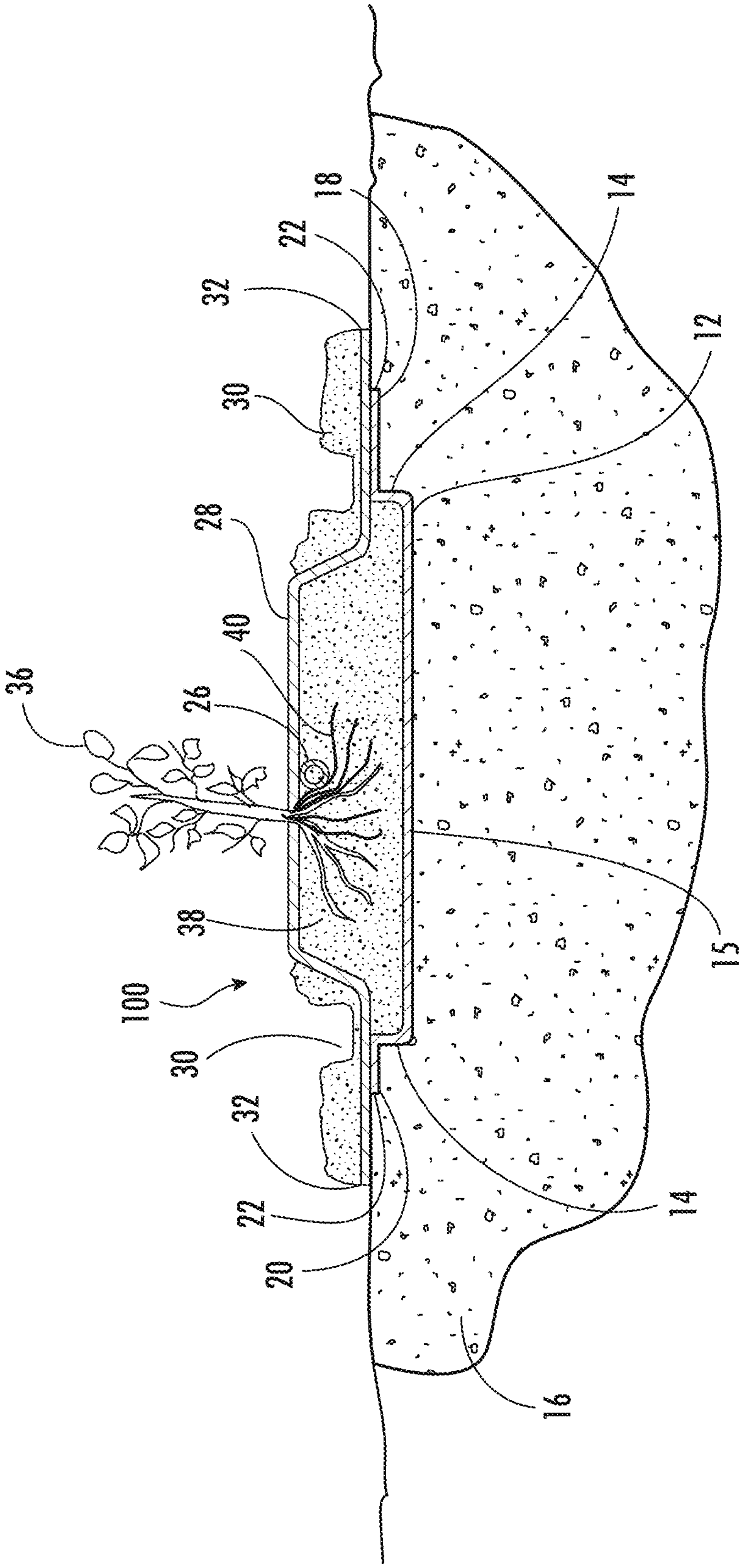
FIG. 40 is a section view illustrating a cross section of the enclosed plant bed illustrating the upper bedding sheet, the lower bedding sheet, and the compression seal enclosing the soil.

Referring generally to FIGS. 1-40, and more particularly to FIGS. 1-12 and 40, one embodiment of the plant bedding system and method 100 is illustrated. The plant bedding system 100 of the preferred embodiment includes ground preparation, which includes a bed trencher 10 for forming a depression 12 in the topsoil 16. The depression 12 is relatively shallow and may include sidewalls 14. The depression 12 is generally sized to allow a suitable amount of topsoil 16 to be moved to a side position adjacent the depression 12, as illustrated in FIGS. 7-11. A first piece of sheet material 18 is laid along the depression 12 with a remainder 20 of the first sheet material 18 positioned on one or both sides of the depression 12, thereby covering the depression. The depression topsoil 24, e.g., soil from forming the depression, is moved from its position at either side of the depression 12 onto the first sheet 18 with the distal edges 22 of the sheet 18 protruding from the sides of the depression 12. The depression topsoil 24 is thereafter formed into a desired shape with rollers, blades and the like. Suitable shapes include, but should not be limited to, a trapezoid, chord, or a rectangle when viewed from the end. A drip tube 26 is positioned within the shaped plant bed 38 and extends along the length of the formed depression topsoil 24. Once the depression topsoil 24 is shaped and the drip tube 26 placed, a second sheet 28 of material is positioned across the top surface of the shaped depression topsoil 24 having the distal edges 32 positioned to overlap the first sheet material 18 at the distal edges 22 thereof. In the preferred embodiment, a small portion of the depression topsoil 24 is positioned on top of the overlapping distal edges 22, 32 to be used as compression seals 30 to hold the sheet material 18 and 28 in a closed position as illustrated in FIG. 40. In some embodiments, compression rollers may be utilized to compact the compression seals 30. Alternatively, the distal edges 22, 32 may be glued, welded, stitched, or otherwise secured together to form the elongate tubular shaped plant bed 38 of the sheet material 18, 28 containing the depression topsoil 24, as illustrated in FIG. 40. Once the elongate plant bed 38 is formed, seeds, seedlings, plants 36 or the like may be planted through the sheet material 28 as is known in the art, so that the roots are positioned within the elongate plant bed 38 and the remainder of the plant 36 extends out of the plant bed. While the figures illustrate the distal edges 22, 32 of the sheet material 18, 28 as being positioned on one or opposite sides of the depression 12, it should be noted that the distal edges 22, 32 may be positioned at any point around the depression topsoil 24, so long as the distal edges 22, 32 are secured together to form the elongated plant bed 38 to hold in the water and fertilizer, without departing from the scope of the invention. The plant bedding system 100 is also extremely versatile for a variety of crops and crop types. For example, the depression 12 can be sized to create beds of topsoil of various sizes for different crops. As a non-limiting example, for strawberries and tomatoes, a trapezoid or rectangle of depression topsoil 24 could be sized for eighteen inches of depth and twenty-four inches of width. Watermelons may need six to twelve inches of topsoil depth and thirty-six inches of width. The elongated plant beds 38 of depression topsoil 24 may be spaced to have longitudinal centerlines that are at any suitable distance apart with respect to each other for equipment to pass between the plant beds. As a non-limiting example, six feet apart is very common for watermelon growth and harvest. However, plant beds for strawberries may be placed closer together, provided the farm equipment 42 will fit between or over the top of the plant beds 38. In this manner, the present plant bedding system 100 provides great versatility for farming techniques that are employed all over the world for growing various crops. In places where farm land is scarce, the longitudinal centerlines of the crops may be moved closer together and the crops harvested by hand to increase the density of production on smaller tracts of land while minimizing the need for fertilizer and water. The present plant bedding system also provides a method and system 100 for farming areas where the climate is generally thought of as being too arid to successfully grow crops. Because the water is contained within the sheet material 18, 28, these areas may now be utilized to produce food for an ever increasing population.

Conventional methods of staking and tying plants, such as tomato plants, are useful with the elongated plant beds 38. The plant bedding system 100 and method is suitable for use on typical farm fields that may range from a few acres to several hundred acres without departing from the scope of the invention.

Figure 7:
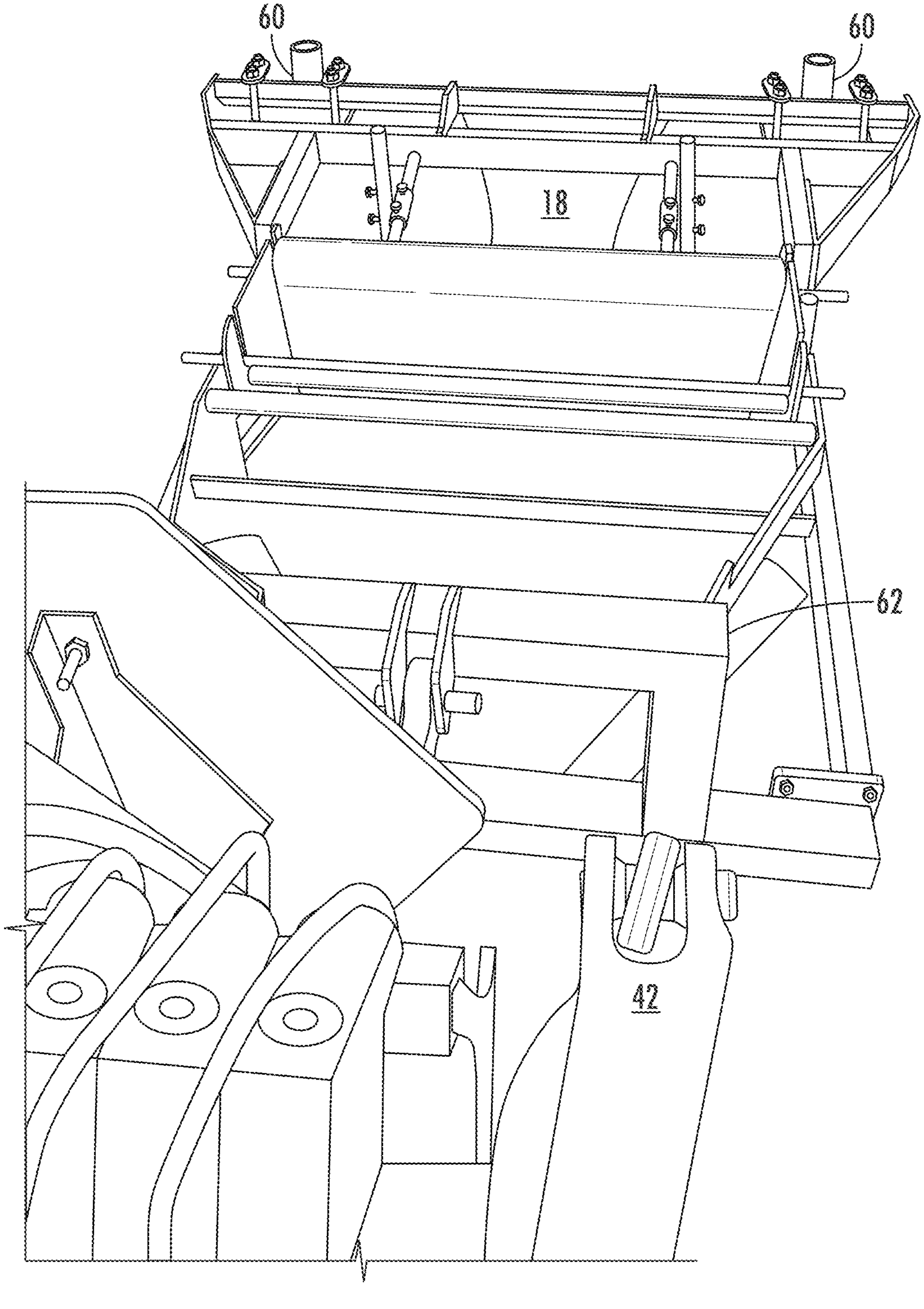
FIG. 7 is a top perspective view illustrating the start of the formation of an enclosed plant bed.
Figure 8:
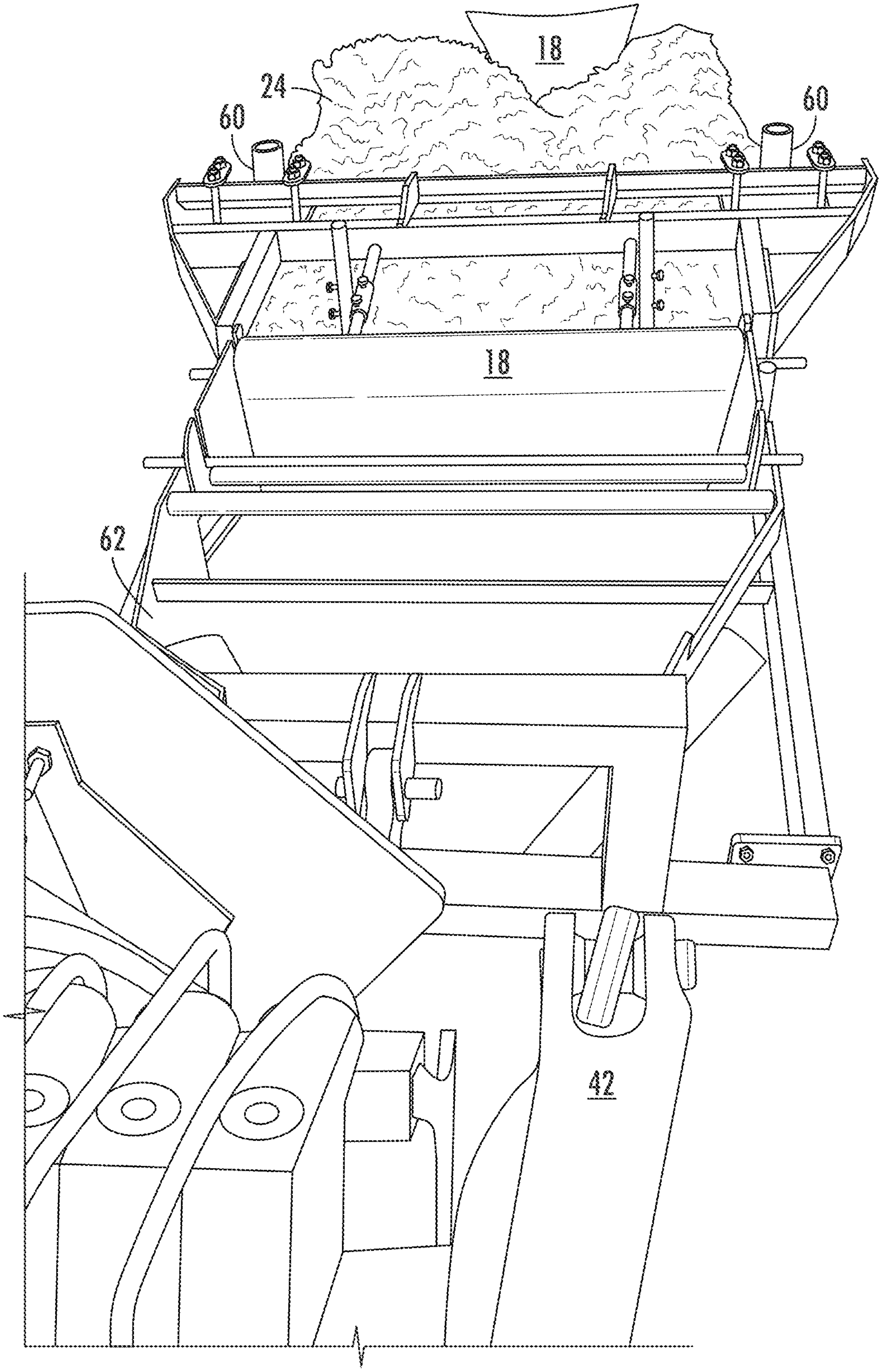
FIG. 8 is a top perspective view illustrating placement of the lower plastic sheet under the plant bed.
Figure 9:
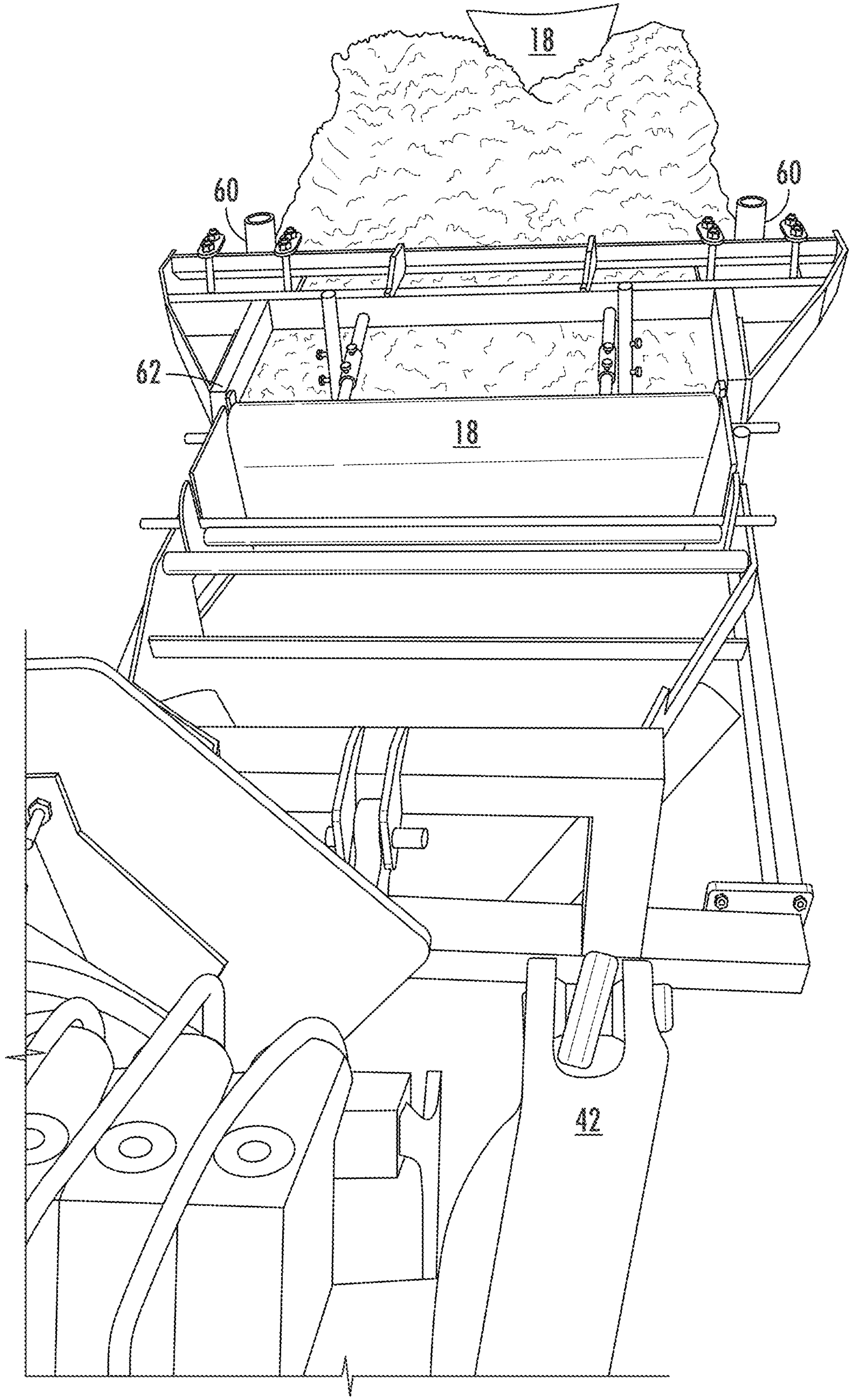
FIG. 9 is a top perspective view illustrating placement of the lower bedding sheet under the plant bed.
Figure 10:
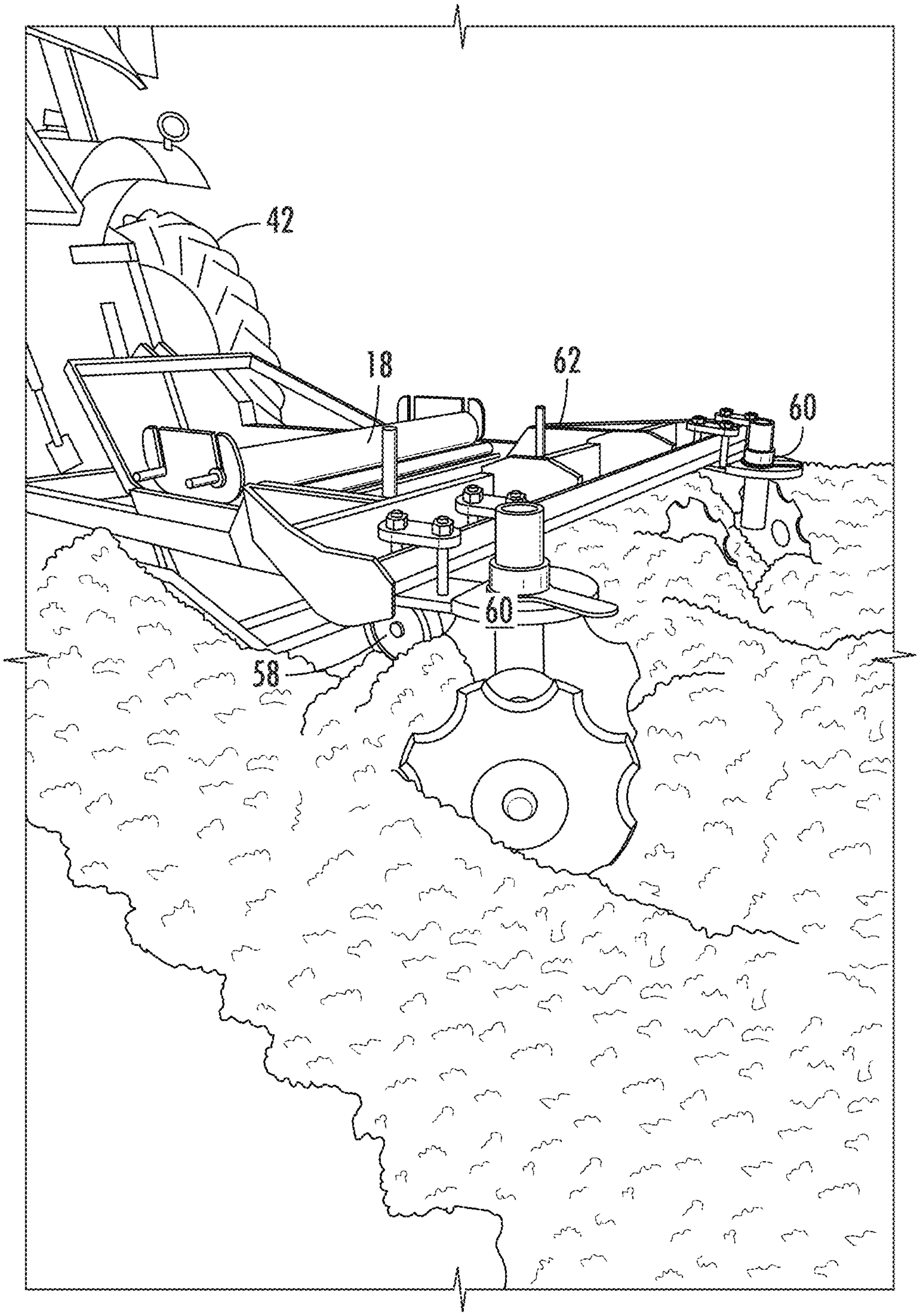
FIG. 10 is a rear perspective view illustrating placement of the bedding soil onto the lower bedding sheet.
Figure 11:
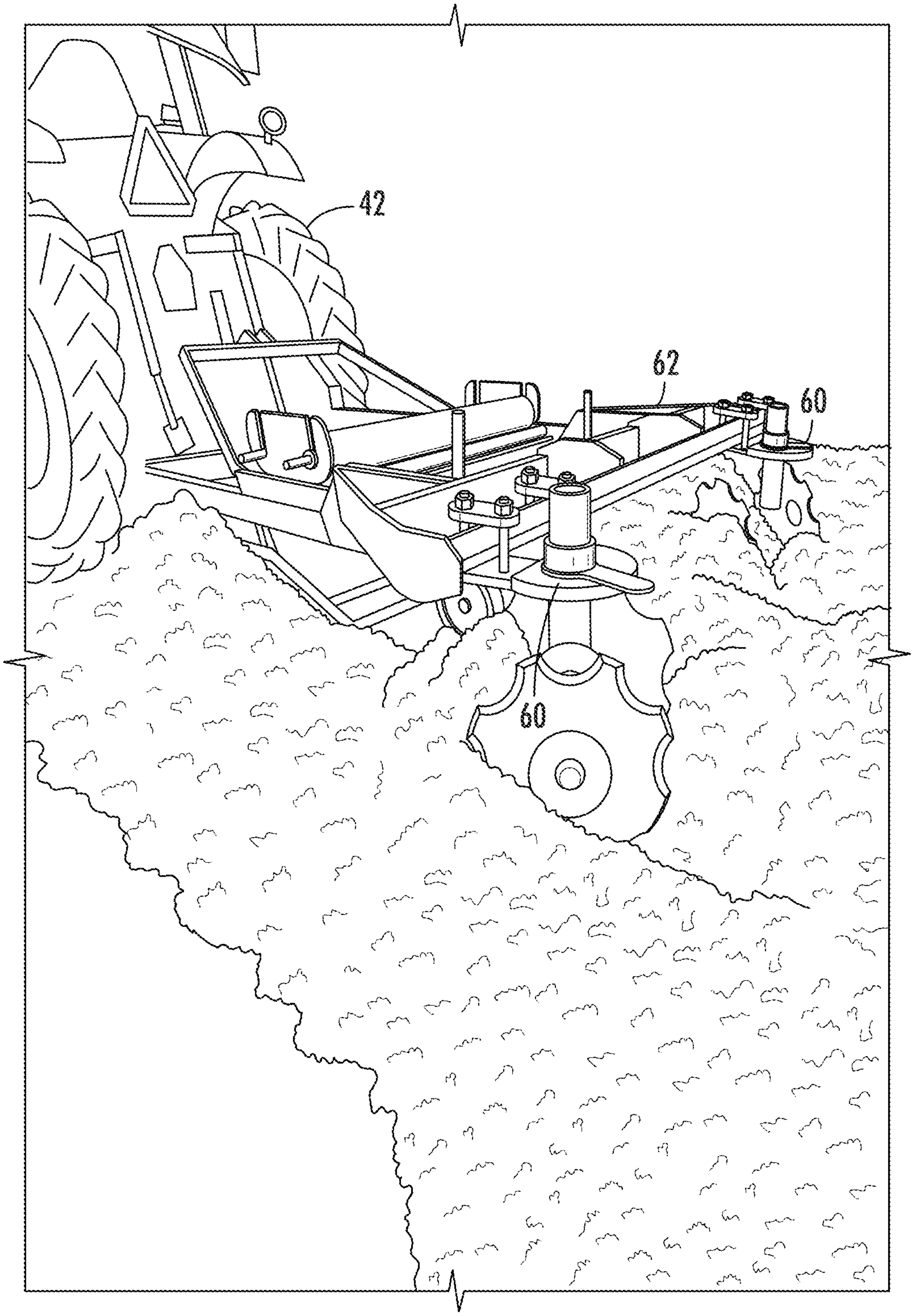
FIG. 11 is a rear perspective view illustrating placement of the bedding soil onto the lower bedding sheet.
Figure 12:
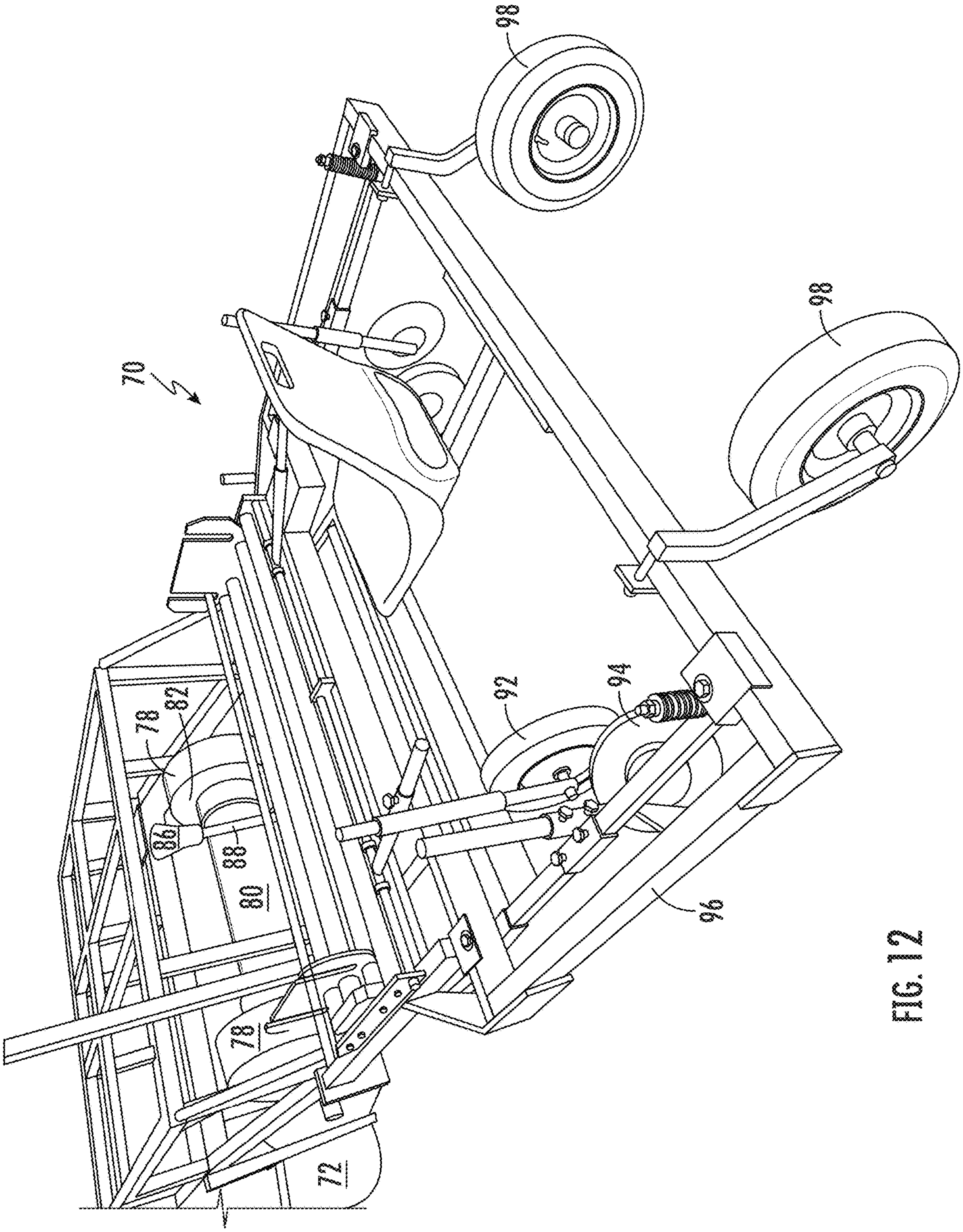
FIG. 12 is a rear perspective view illustrating the bed shaper of the present plant growing system.
Figure 13:
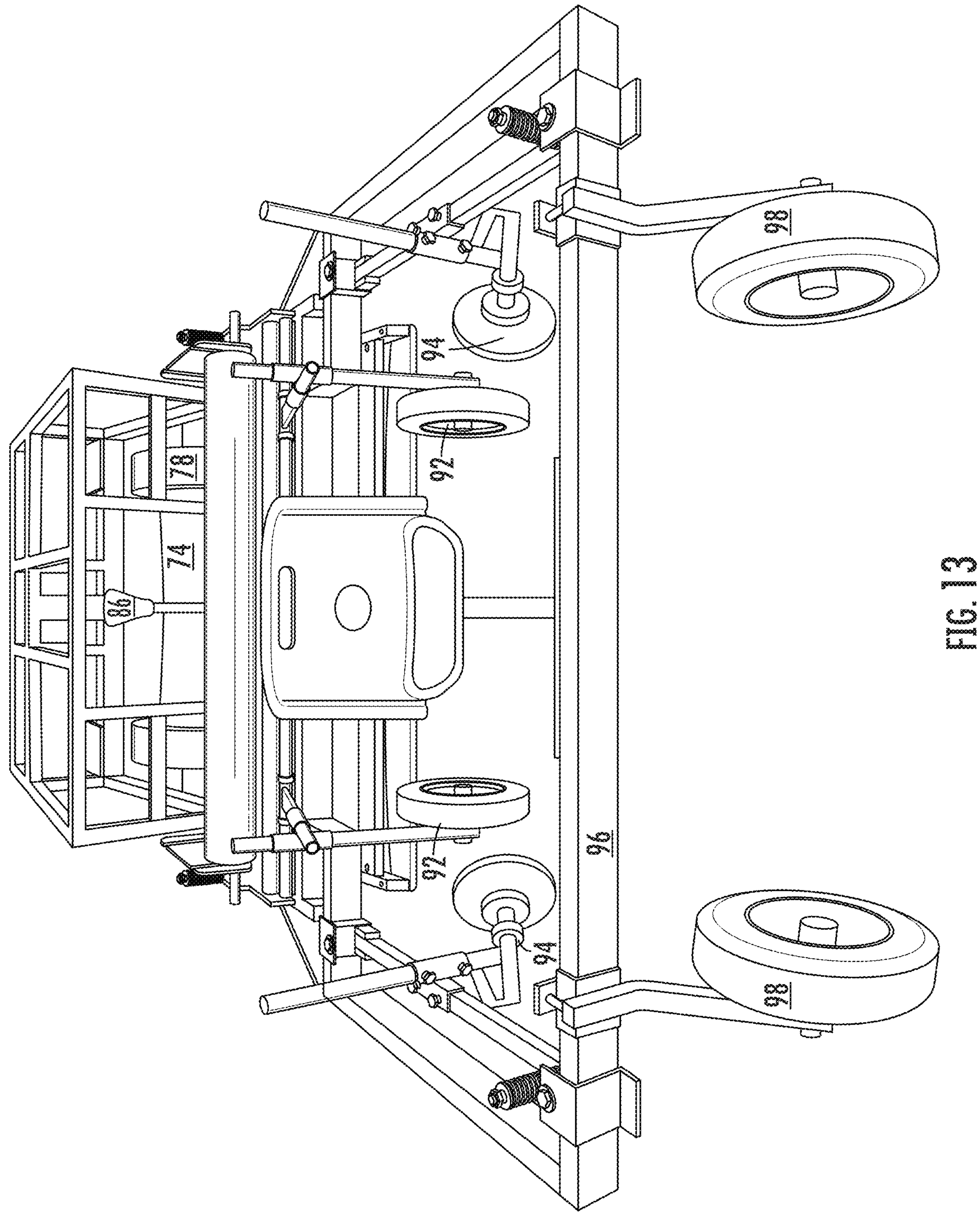
FIG. 13 is a rear view of the bed shaper.
Figure 14:
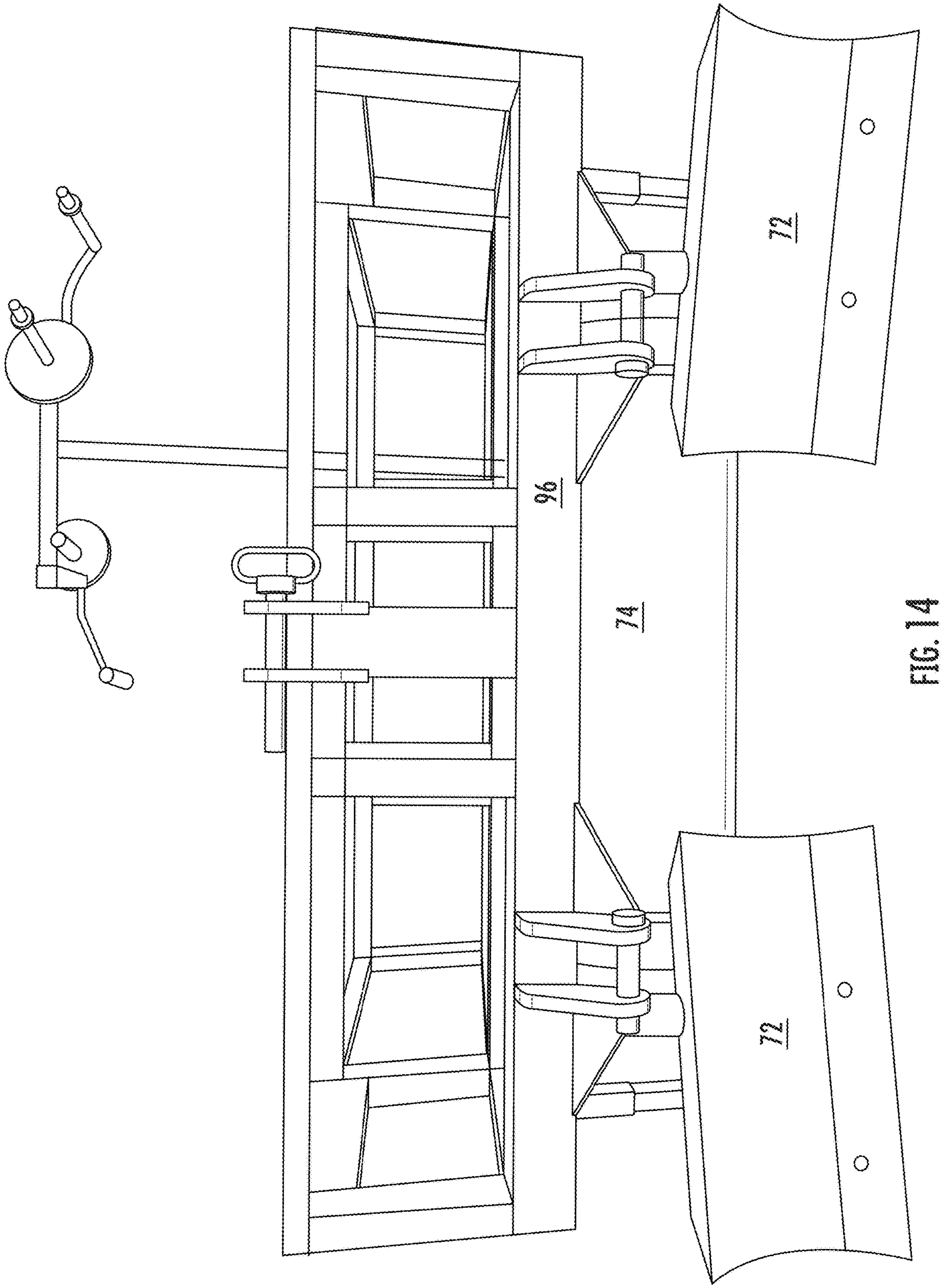
FIG. 14 is a front view of the bed shaper.
Figure 15:
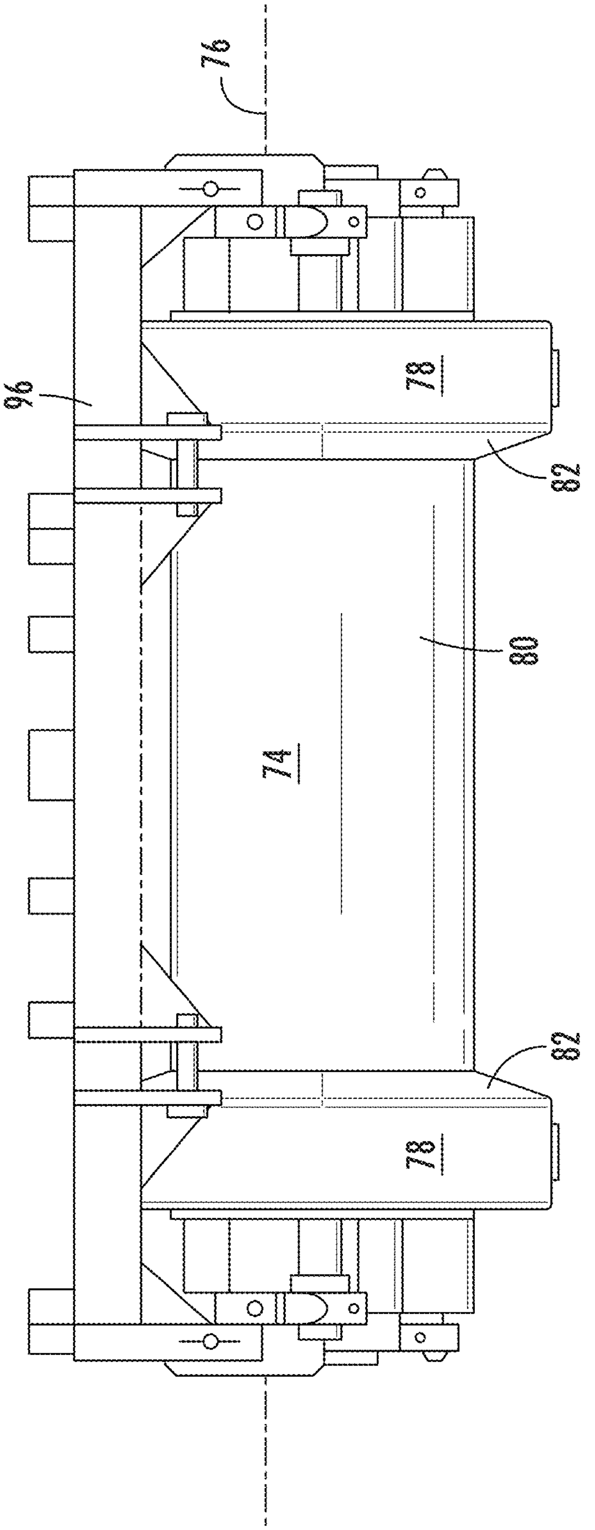
FIG. 15 is a front view of one embodiment of the form roller portion of the bed shaper.
Figure 16:
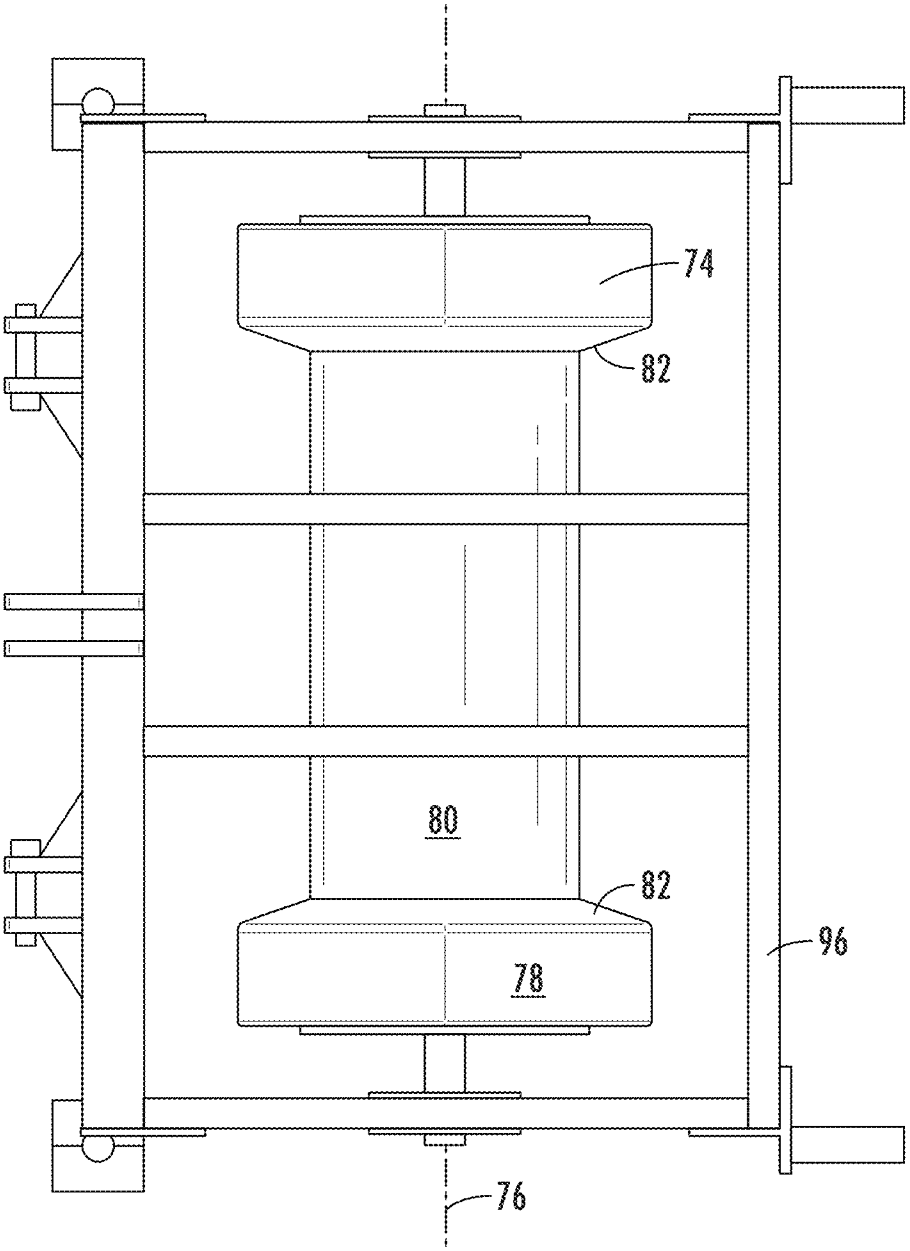
FIG. 16 is a top view of the form roller illustrated in FIG. 15.
Figure 17:
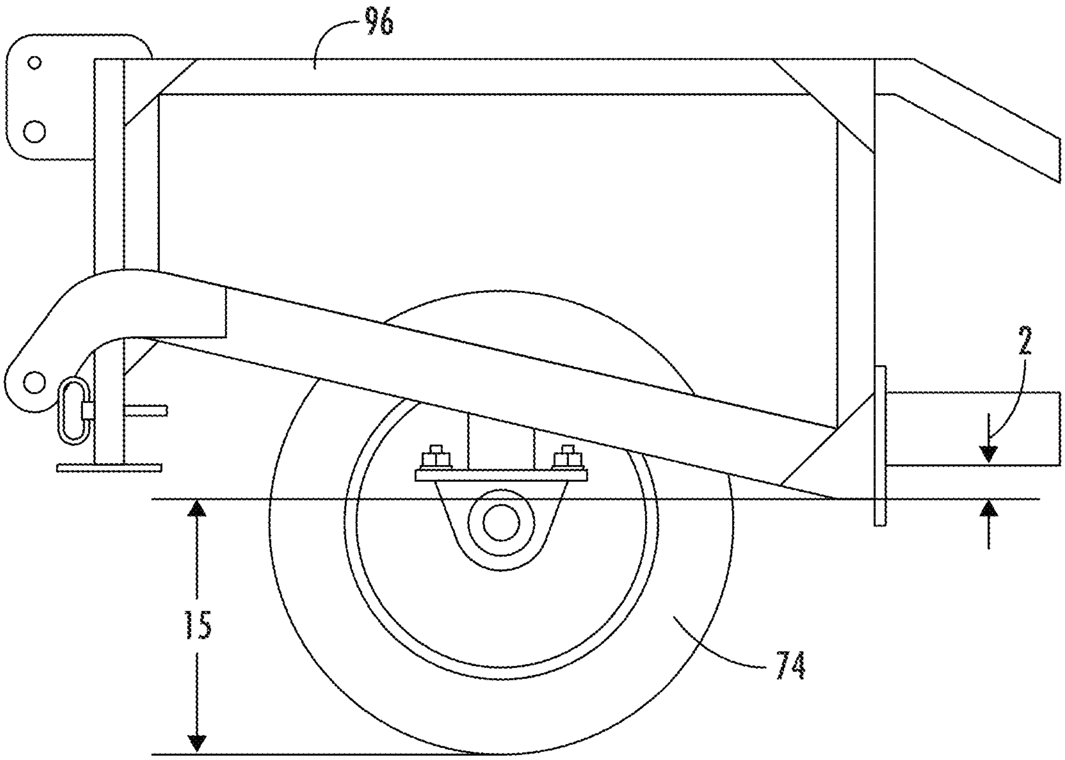
FIG. 17 is a side view of the form roller illustrated in FIG. 15.
Figure 18:
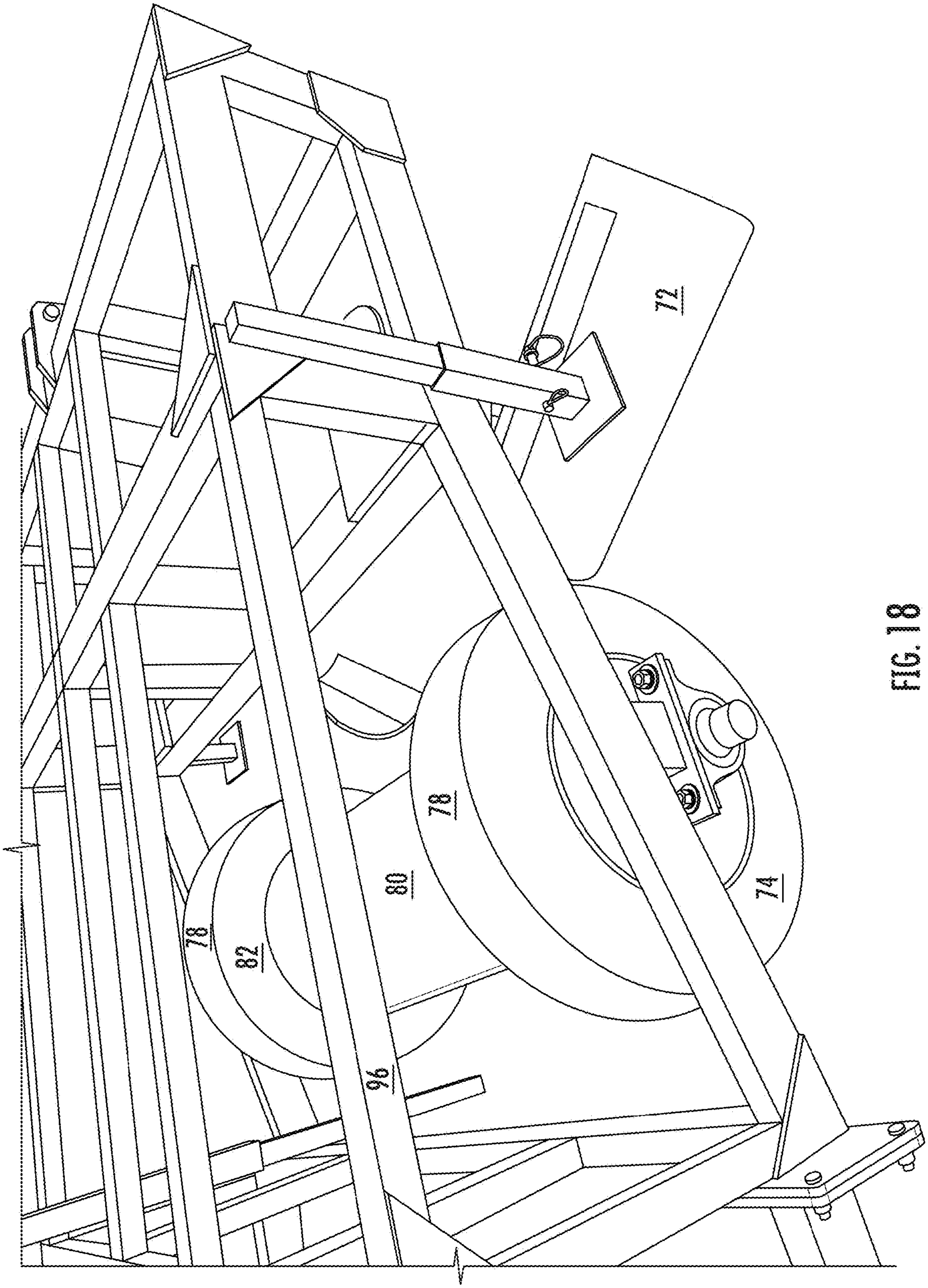
FIG. 18 is a partial side perspective view of the bed shaper and the form roller.
Figure 19:
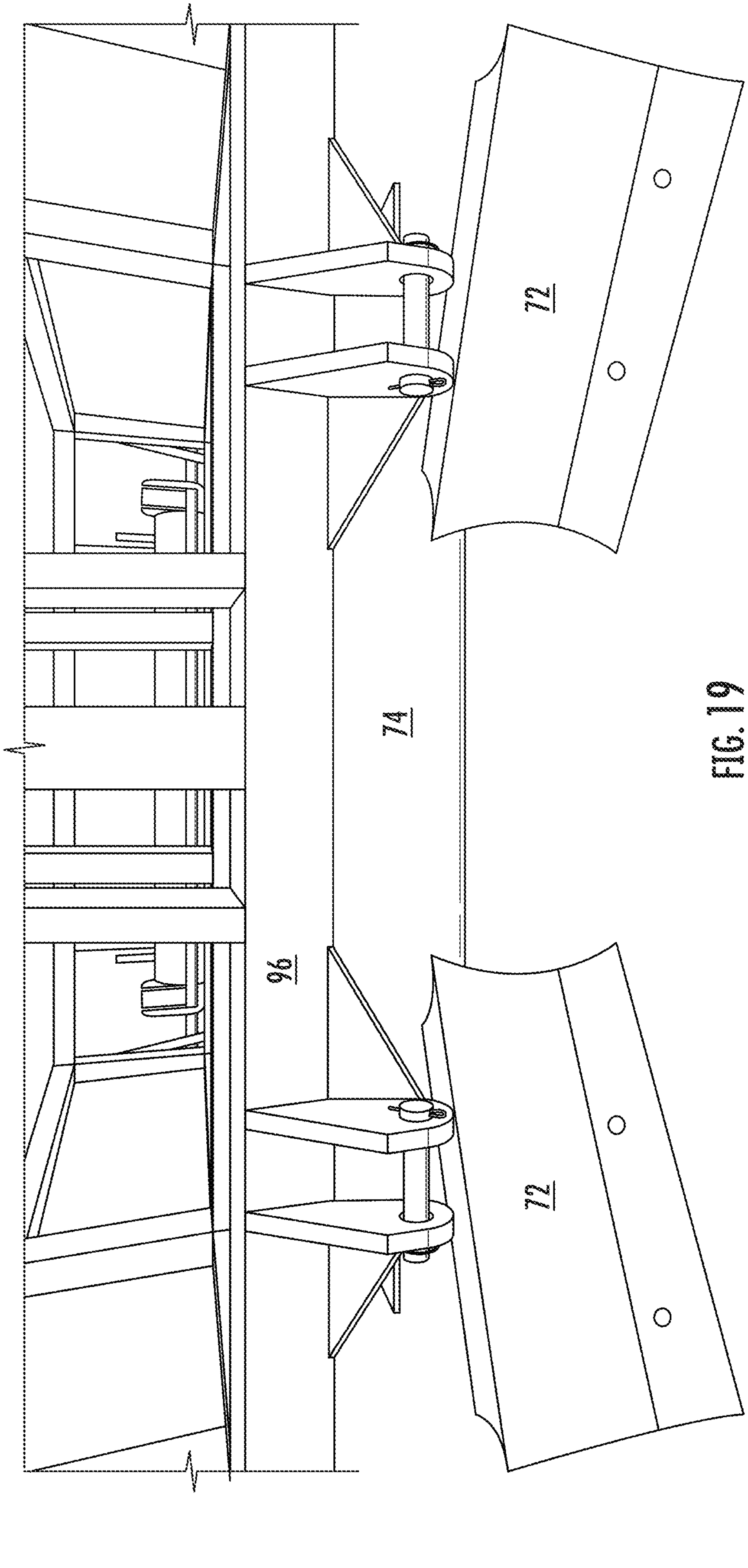
FIG. 19 is a partial front view illustrating the funnel blades for gathering soil and directing it to the form roller.
Figure 20:
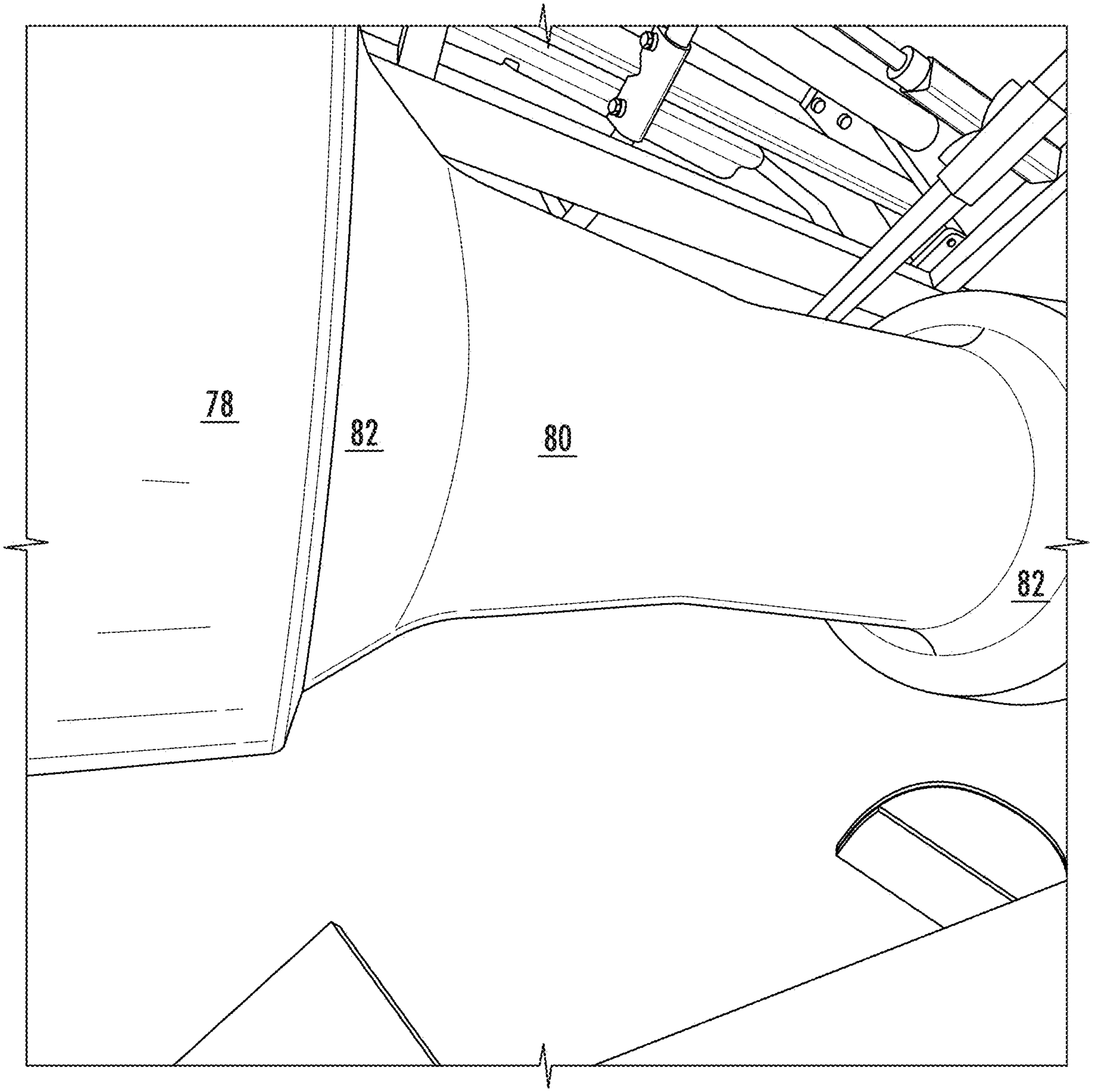
FIG. 20 is a partial top perspective view illustrating a portion of the form roller.
Figure 21:
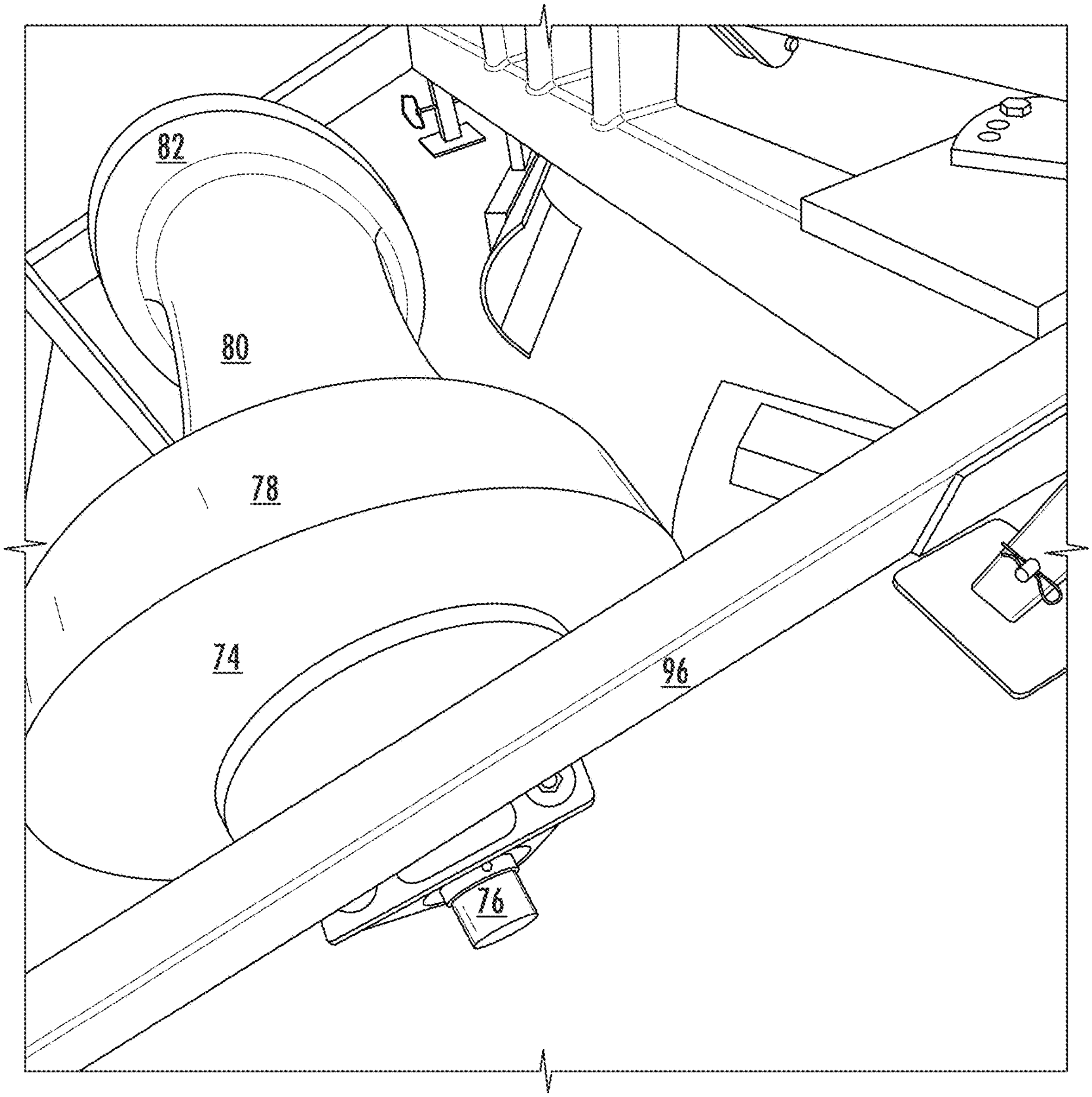
FIG. 21 is a partial top perspective view illustrating a portion of the form roller.
Figure 22:
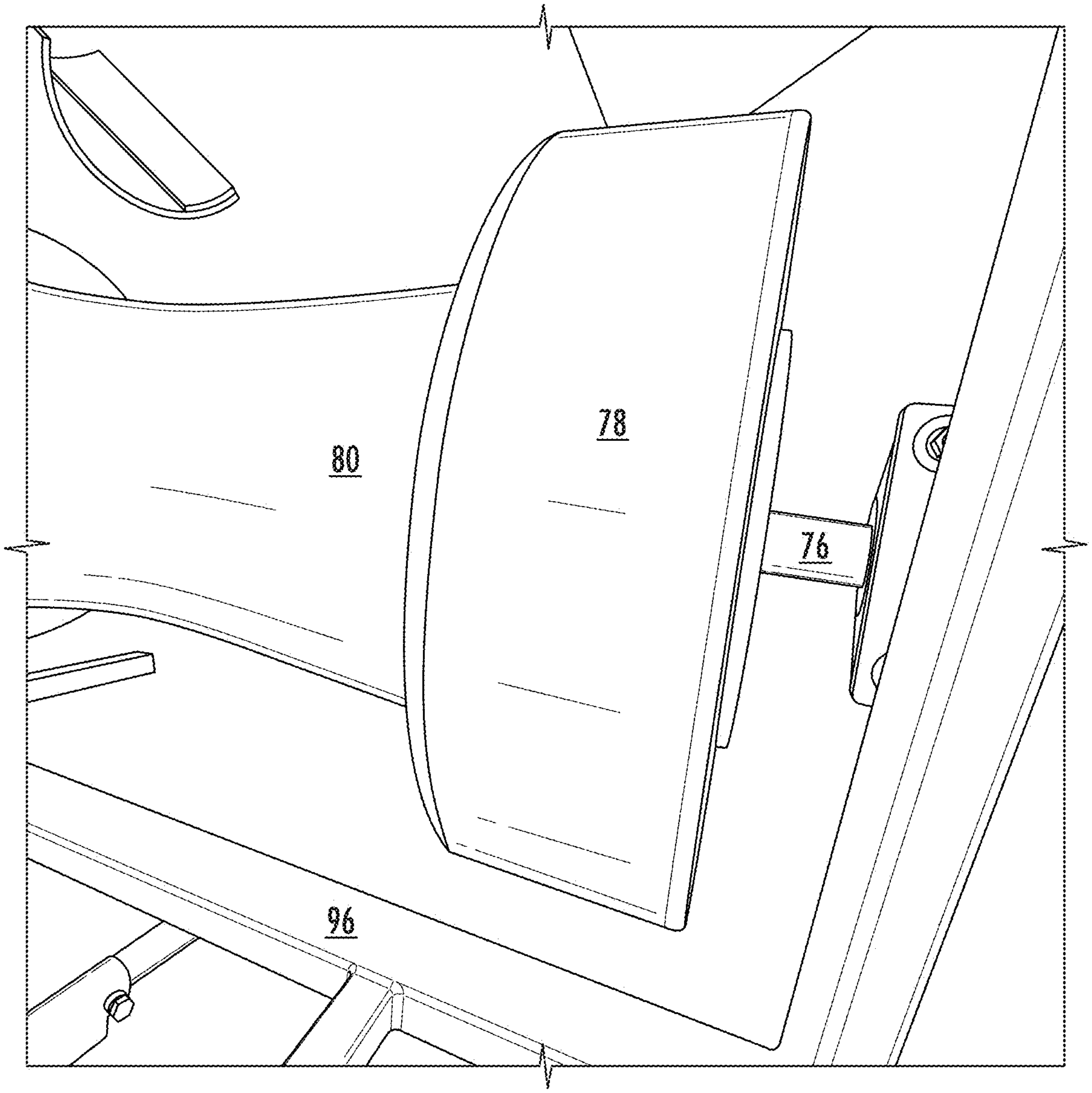
FIG. 22 is a partial top perspective view illustrating a portion of the form roller.
Figure 23:
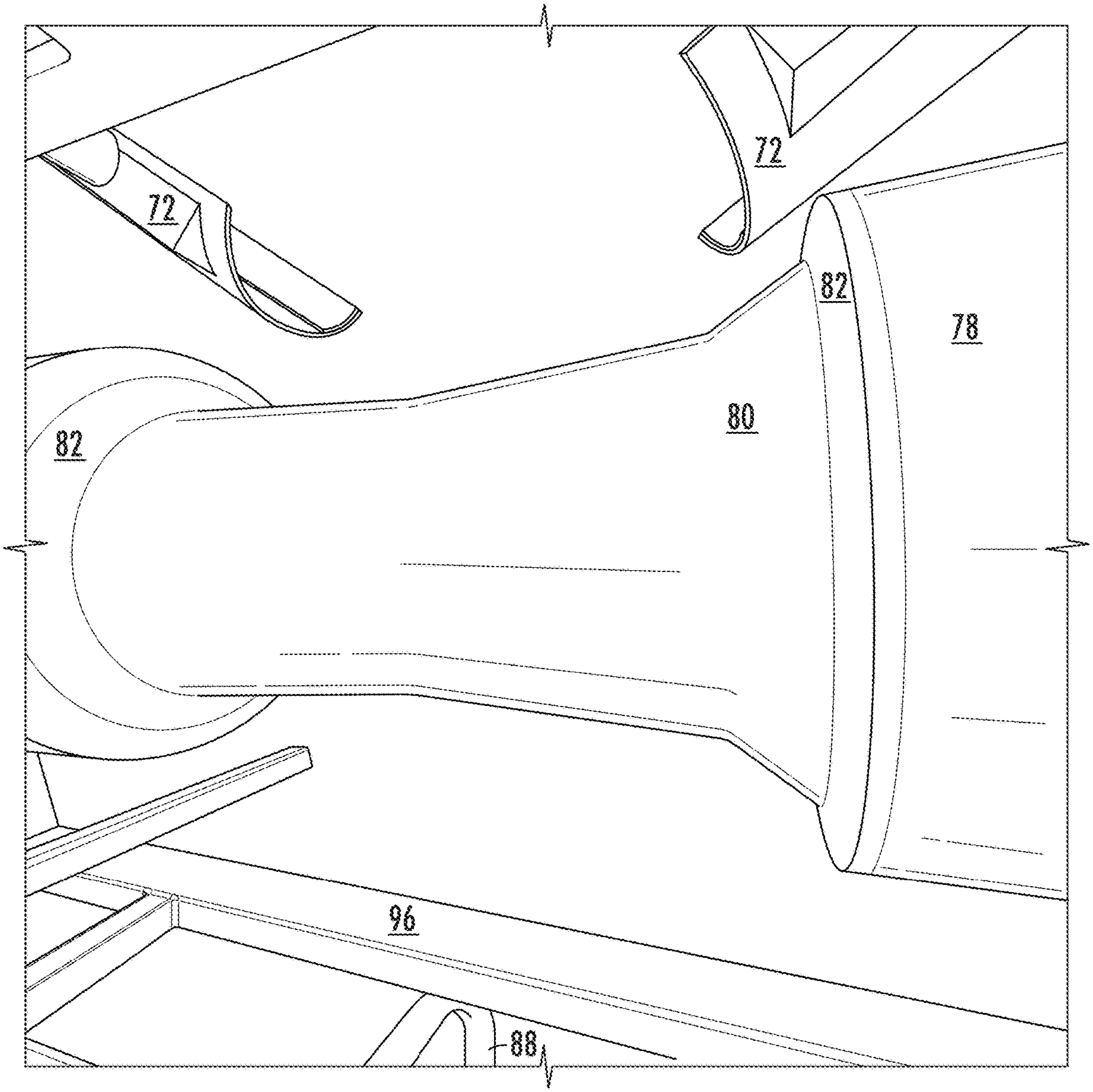
FIG. 23 is a partial top perspective view illustrating a portion of the form roller.
Figure 24:
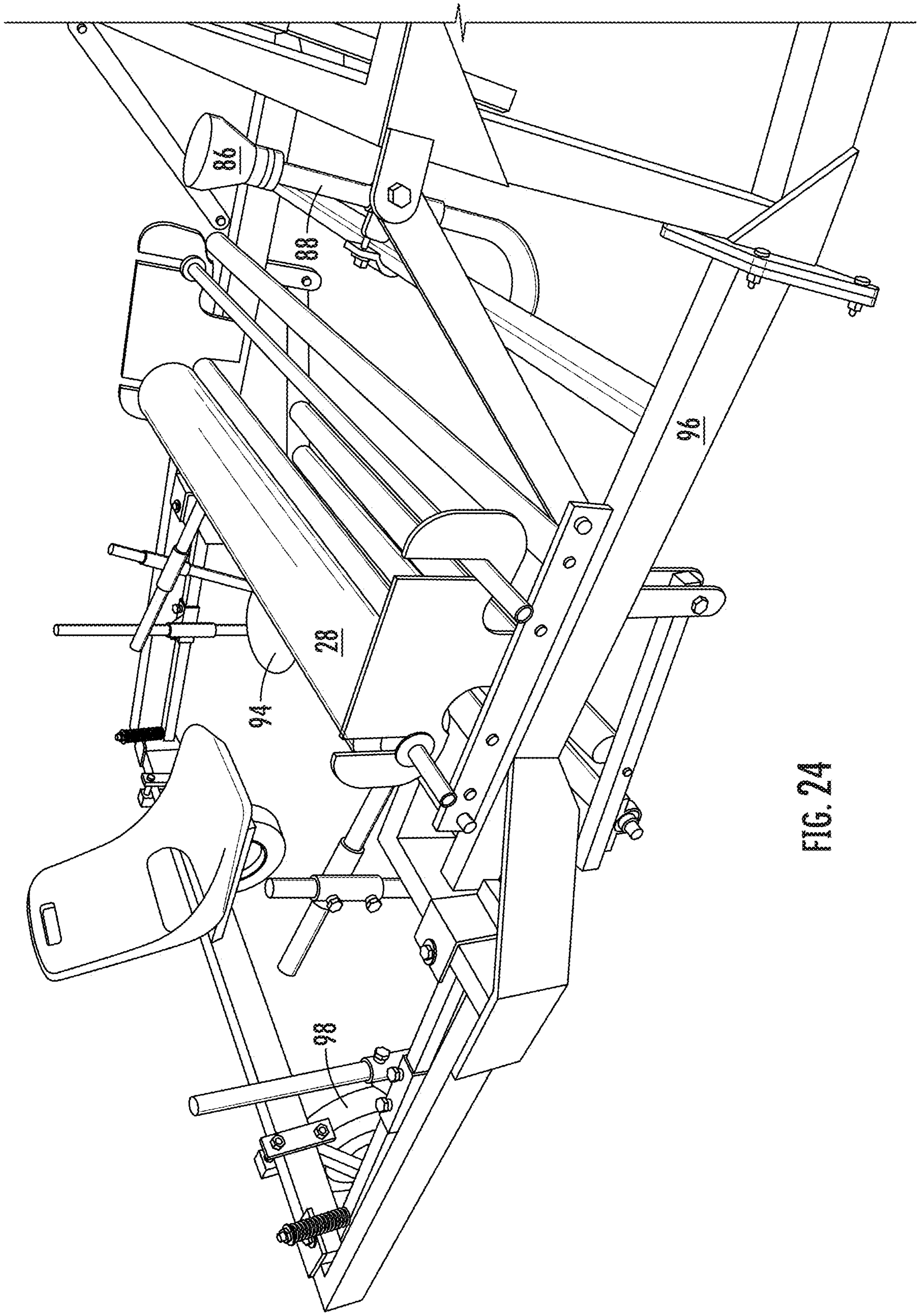
FIG. 24 is a partial top perspective view illustrating the rear portion of the bed shaper.
Figure 25:
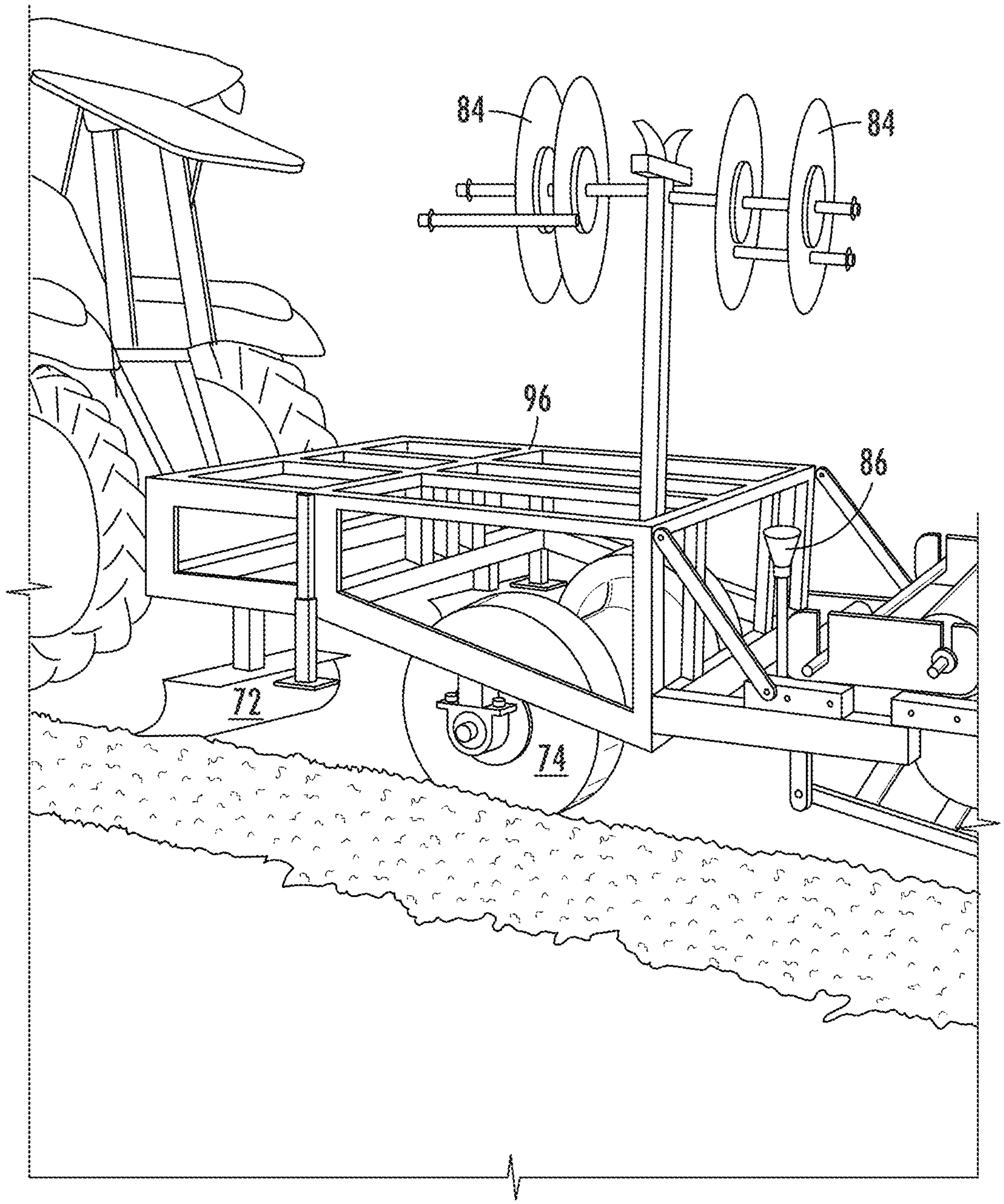
FIG. 25 is a partial side perspective view illustrating the front portion of the bed shaper.
Figure 26:
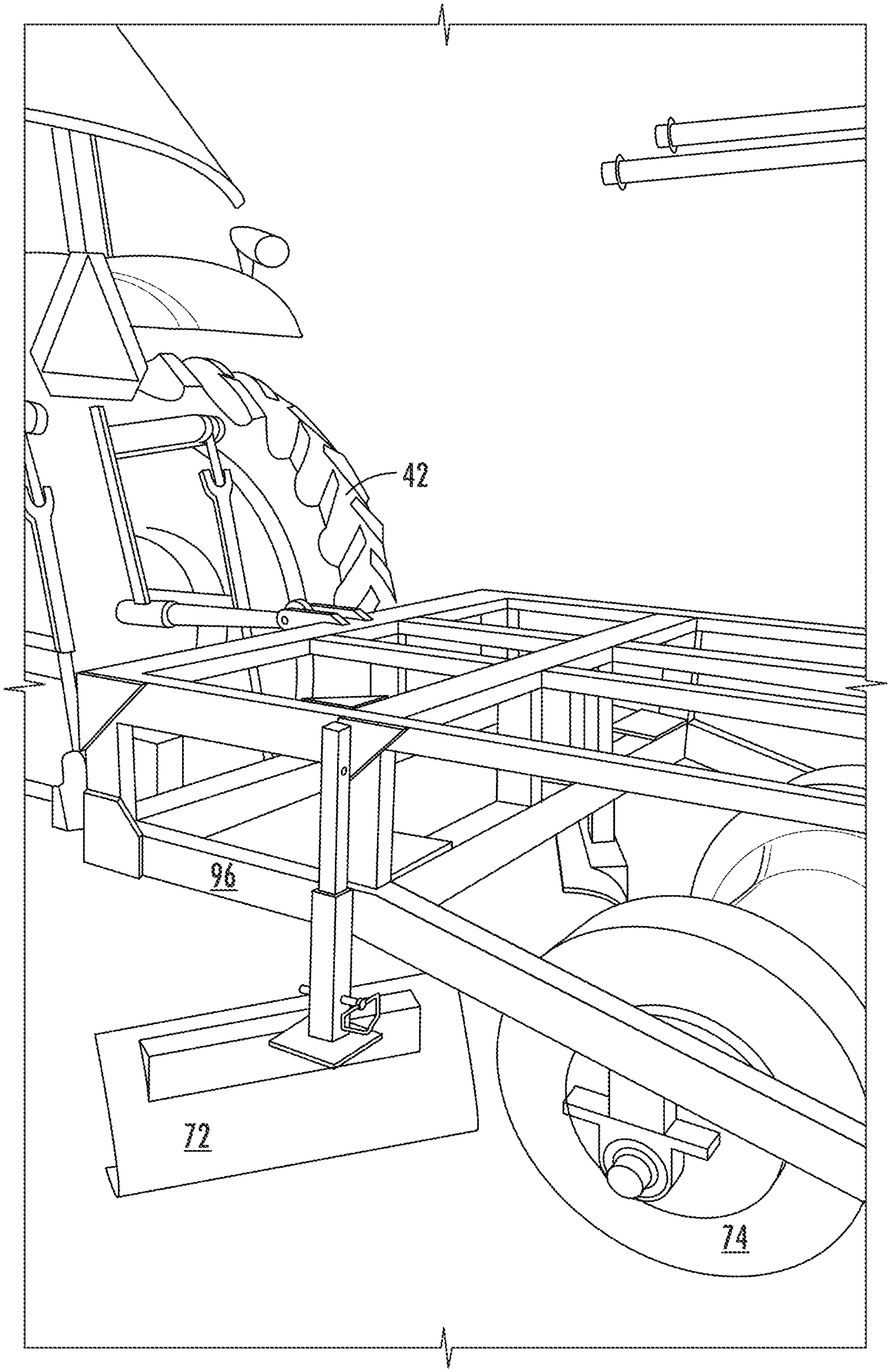
FIG. 26 is a partial side perspective view illustrating the front portion of the bed shaper.
Figure 27:
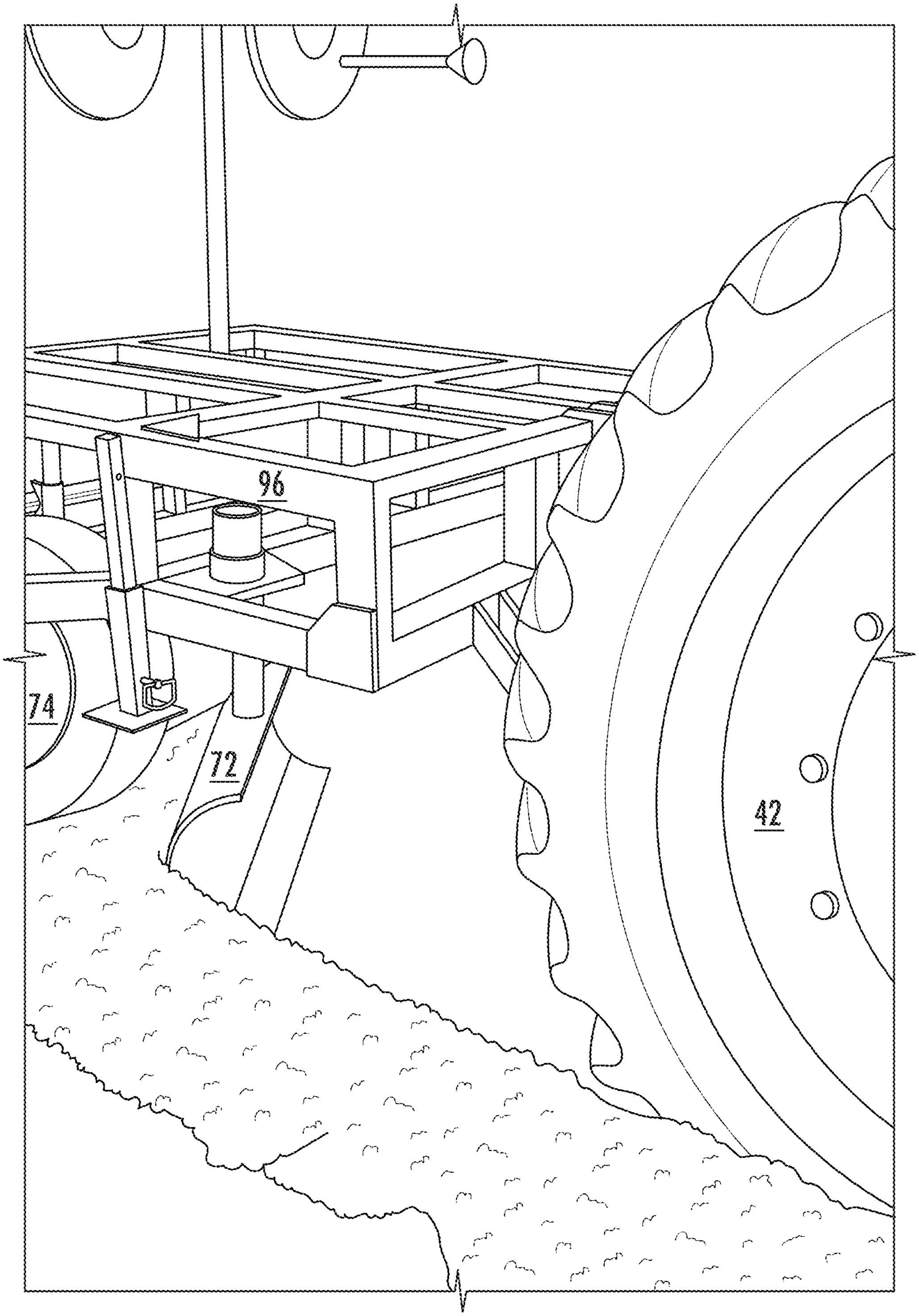
FIG. 27 is a partial front side perspective view illustrating the front portion of the bed shaper.
Figure 28:
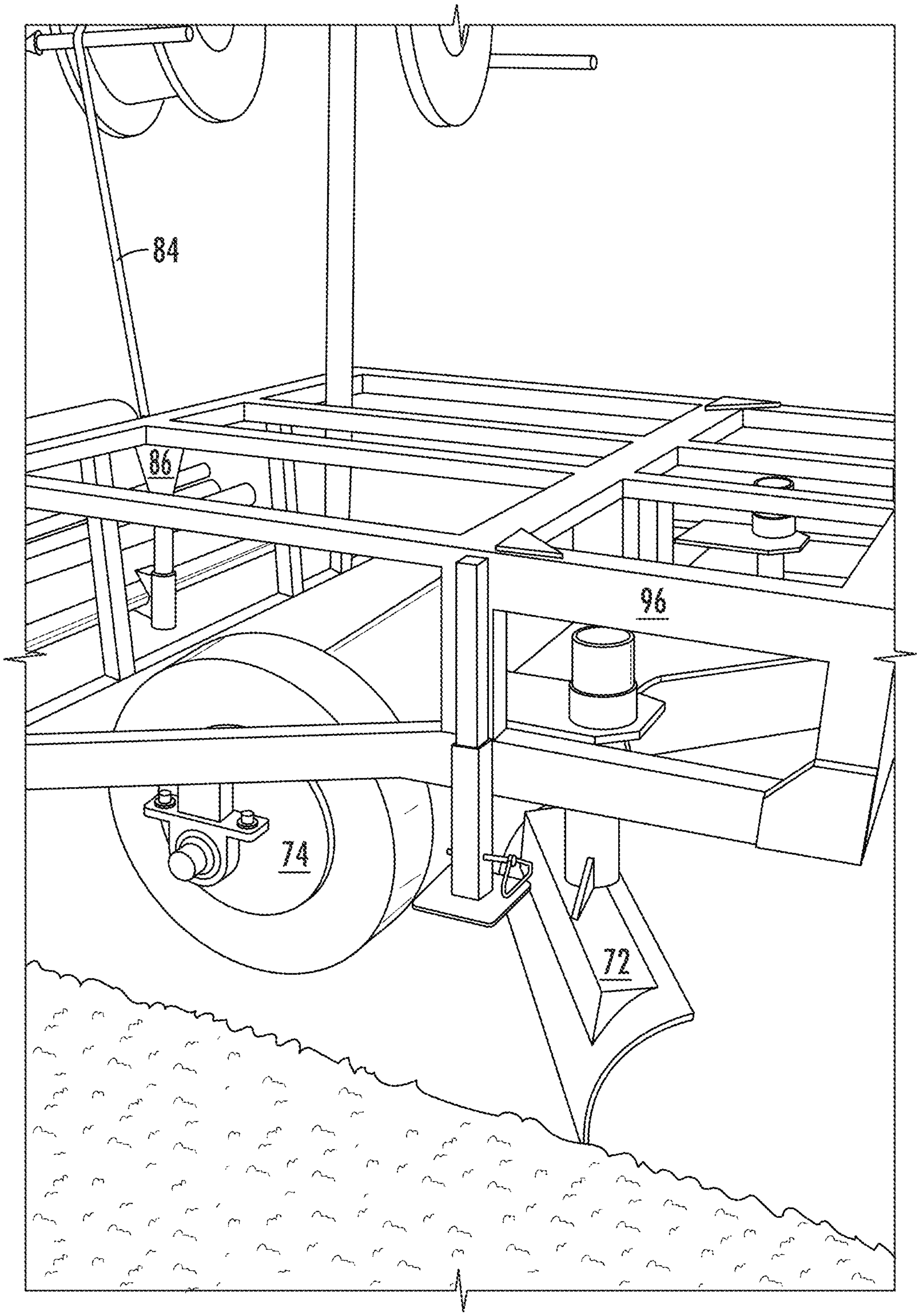
FIG. 28 is a partial side perspective view illustrating the front portion of the bed shaper.

Still referring to the figures, and more specifically to FIGS. 1-12 and 40, the bed trencher 10 is illustrated. The bed trencher 10 is generally constructed and arranged to create the depression 12 large enough to accumulate enough soil to construct the plant bed 38. The bed trencher 10 includes a frame 62 for positioning all of the components and allowing them to be pulled by a piece of farm equipment 42, such as a tractor. Secured at a front portion of the frame 62 is the splitter 44 for breaking the soil and directing it to the splitter blades 46. The splitter blades 46 widen the area of the broken soil and direct it outwardly with respect to the longitudinal centerline of the bed trencher 10, creating an elongated depression 12 as the frame 62 is moved forward by the farm equipment 42. The splitter 44 is generally V-shaped when viewed from the top, having a forwardmost point splitter 48 which lowers the force required to break the soil open. A rear portion 50 of the splitter 44 includes a pair of hinges 52 (FIG. 5) which connects the splitter 44 to the forward end 54 of the splitter blades 46. This construction allows the rear end 56 of the splitter blades 46 to be adjusted inwardly or outwardly with respect to the longitudinal centerline of the bed trencher 10 to alter the width of the depression. In general, the width of the depression 12 is formed to be wider than the formed plant bed 38 to create enough loose soil to form the shaped plant bed 38 having the desired thickness and width for proper plant growth. In this manner, the soil is moved out of the depression 12 and piled along both sides of the depression 12. A roll of first sheet material 18, preferably plastic, is mounted for free rotation at a position on the frame 62 that is generally rearward of the rear portion 56 of the splitter blades 46. The sheet material 18 is routed downwardly via roller guides or the like to the depression 12 and includes suitable width to cover the depression, including the side walls 14, and extend outwardly beyond the distal edges of the depression. A pair of first sheet rollers 58 is provided to force the first sheet 18 into the corners of the depression 12 formed by the side walls 14 and the depression base surface 15. The first sheet rollers 58 include an adjustable width which allows them to be positioned to push the sheet material 18 downward and/or outward to position the first sheet properly in the depression 12 as the bed trencher 10 moves forward under power with a tractor or the like. A pair of resetting discs 60 are positioned rearward of the first sheet rollers 58 to redistribute the soil harvested from forming the depression 12 back onto the first sheet 18. In a most preferred embodiment, the resetting discs 60 are adjustable in angle and tilt to allow the soil to be distributed on the first sheet 18 in a preform to create the desired final form for the plant bed 38. In this manner, when a higher plant bed is desired, the resetting discs 60 are adjusted to cause the soil to form a taller pile on the sheet. In some embodiments, more than one resetting disc 60 may be positioned on each side of the bed trencher 10 to move more soil further or create a pre-shape closer to finished shape of the soil piled onto the first sheet 18. Thus, the bed trencher 10 can be pulled across a field by farm equipment 42, such as a tractor or the like, to create the depression 12, lay the first sheet of plastic 18 and reset the soil onto the first sheet for shaping, as illustrated in FIGS. 7-11. FIG. 7 illustrates the start of the plant bed 38 as the first sheet 18 is held in place as the soil is disced onto the sheet. FIGS. 8-11 illustrate operation of the bed trencher 10 at speed, completing the laying of the first sheet and the resetting of the soil onto the first sheet in a preformed shape.

Figure 29:
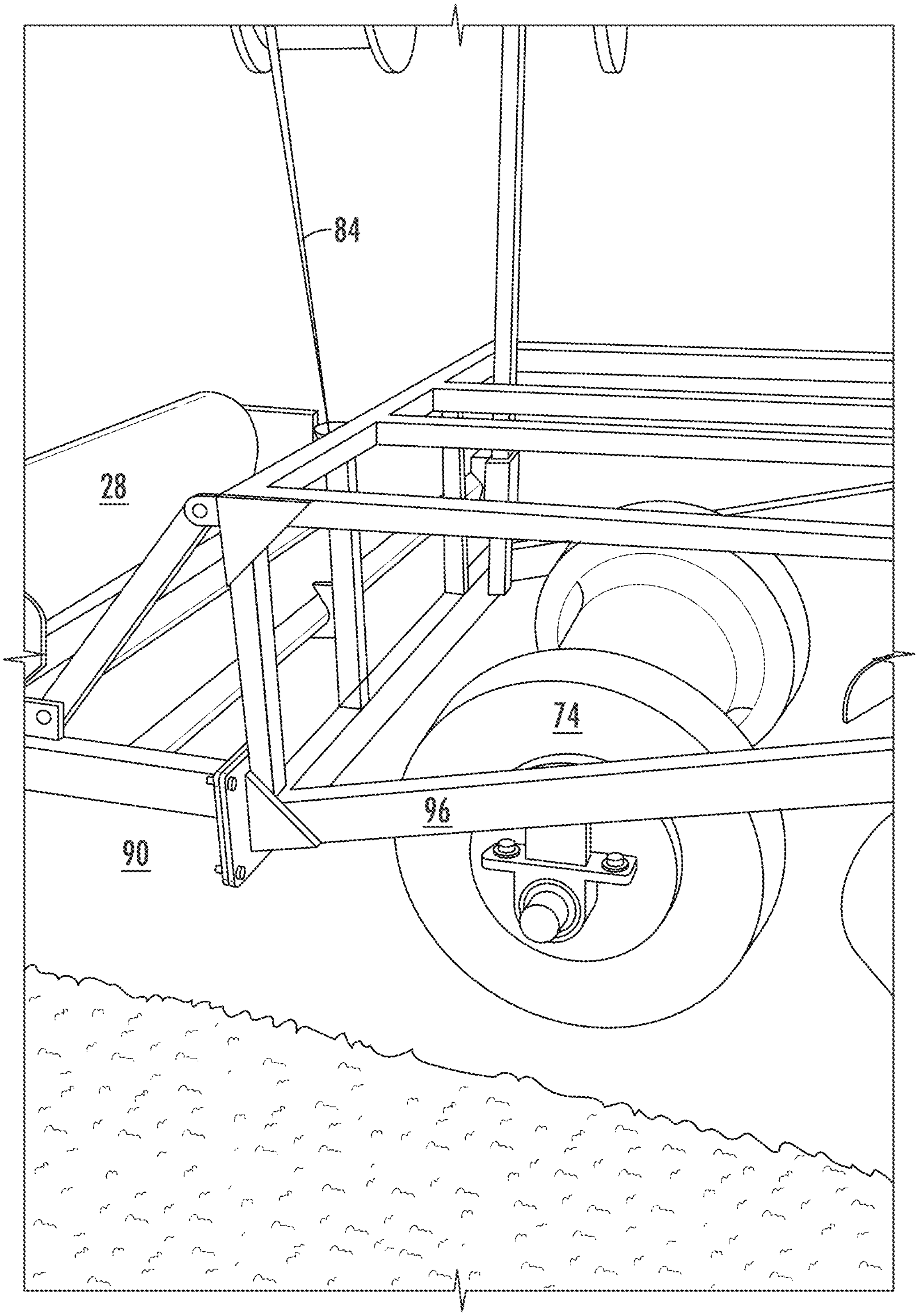
FIG. 29 is a partial side perspective view illustrating the front portion of the bed shaper.
Figure 30:
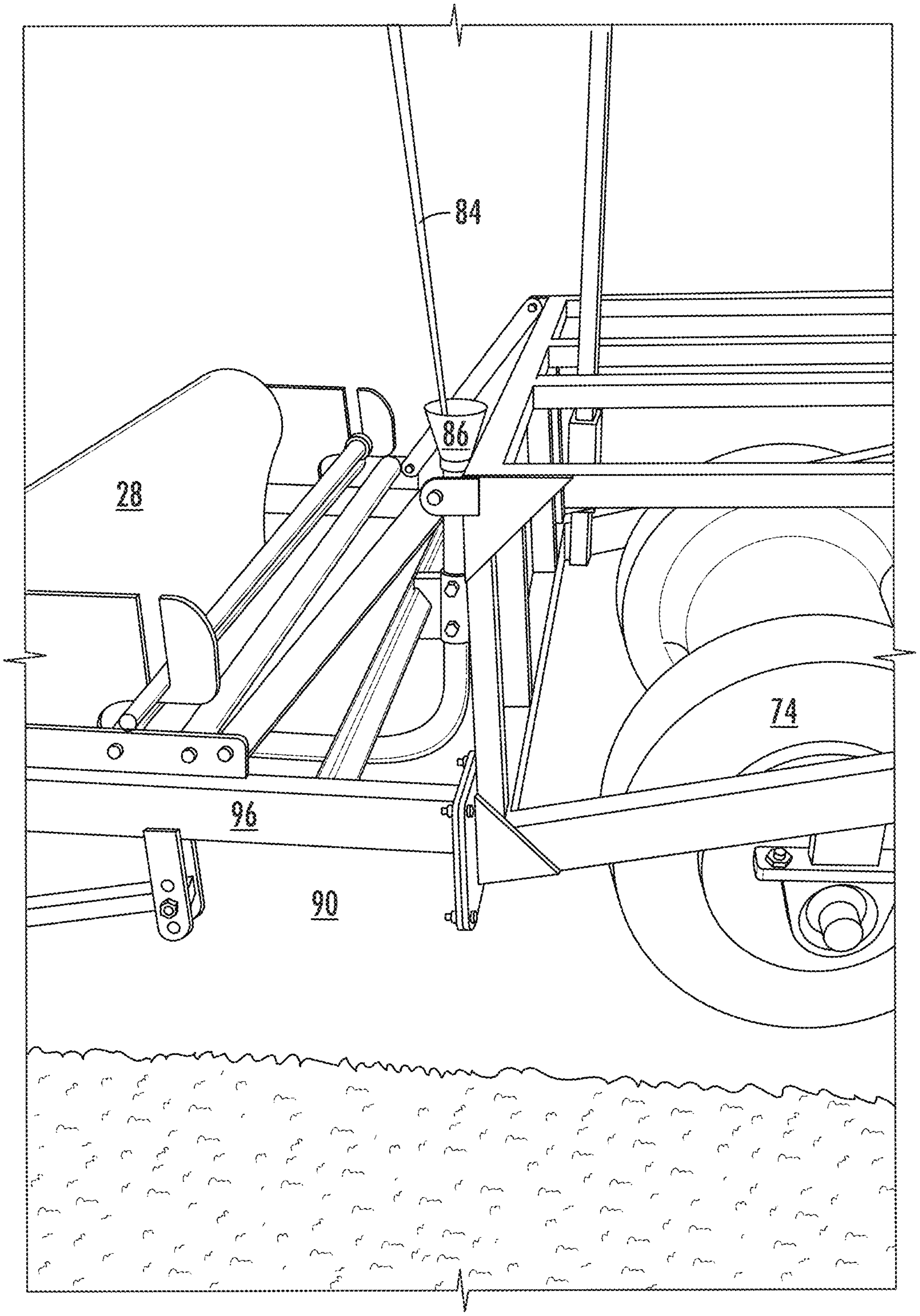
FIG. 30 is a partial side perspective view illustrating the shaped plant bed prior to placement of the upper bedding sheet.
Figure 31:
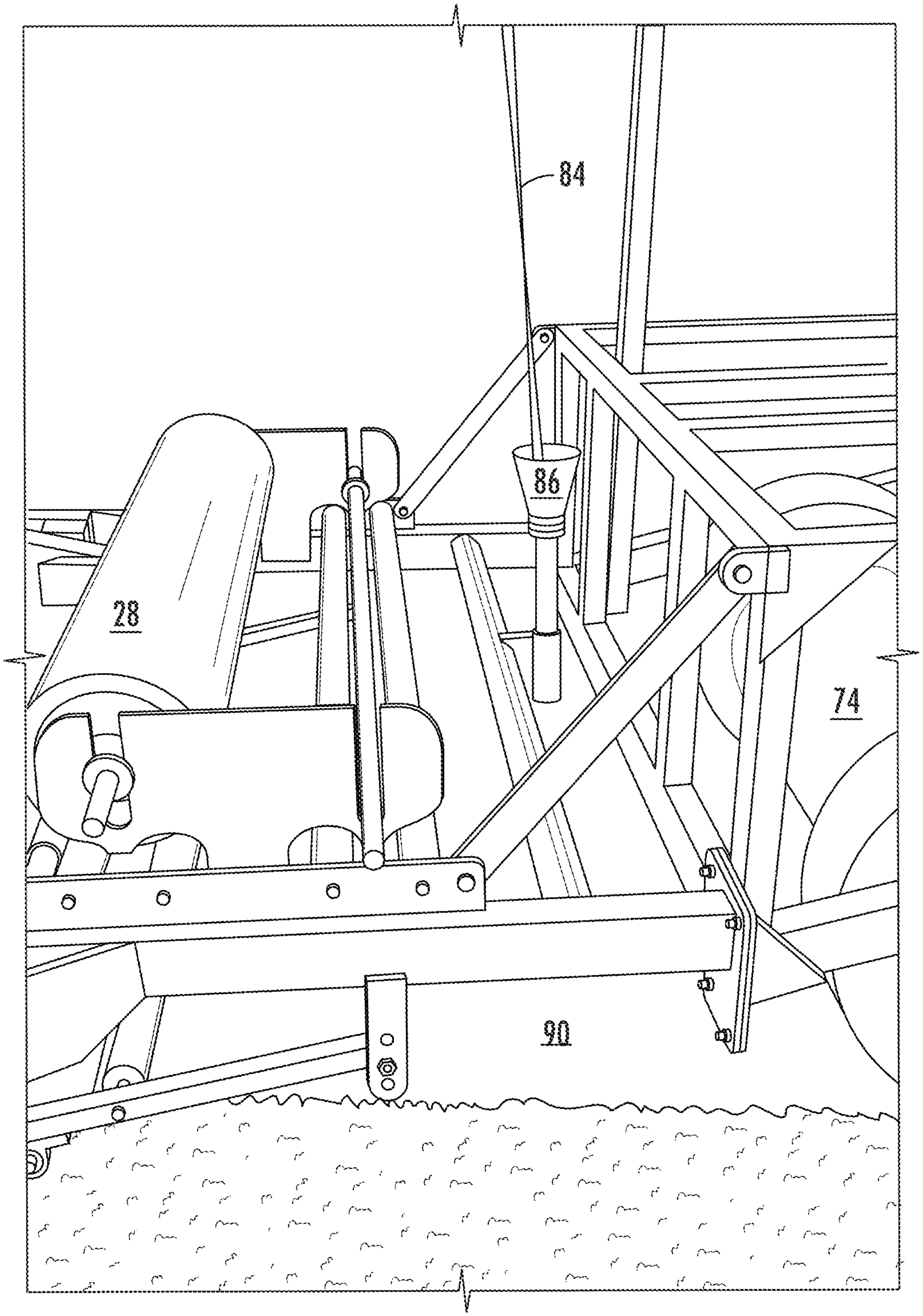
FIG. 31 is a partial side perspective view illustrating the shaped plant bed prior to placement of the upper bedding sheet.
Figure 32:
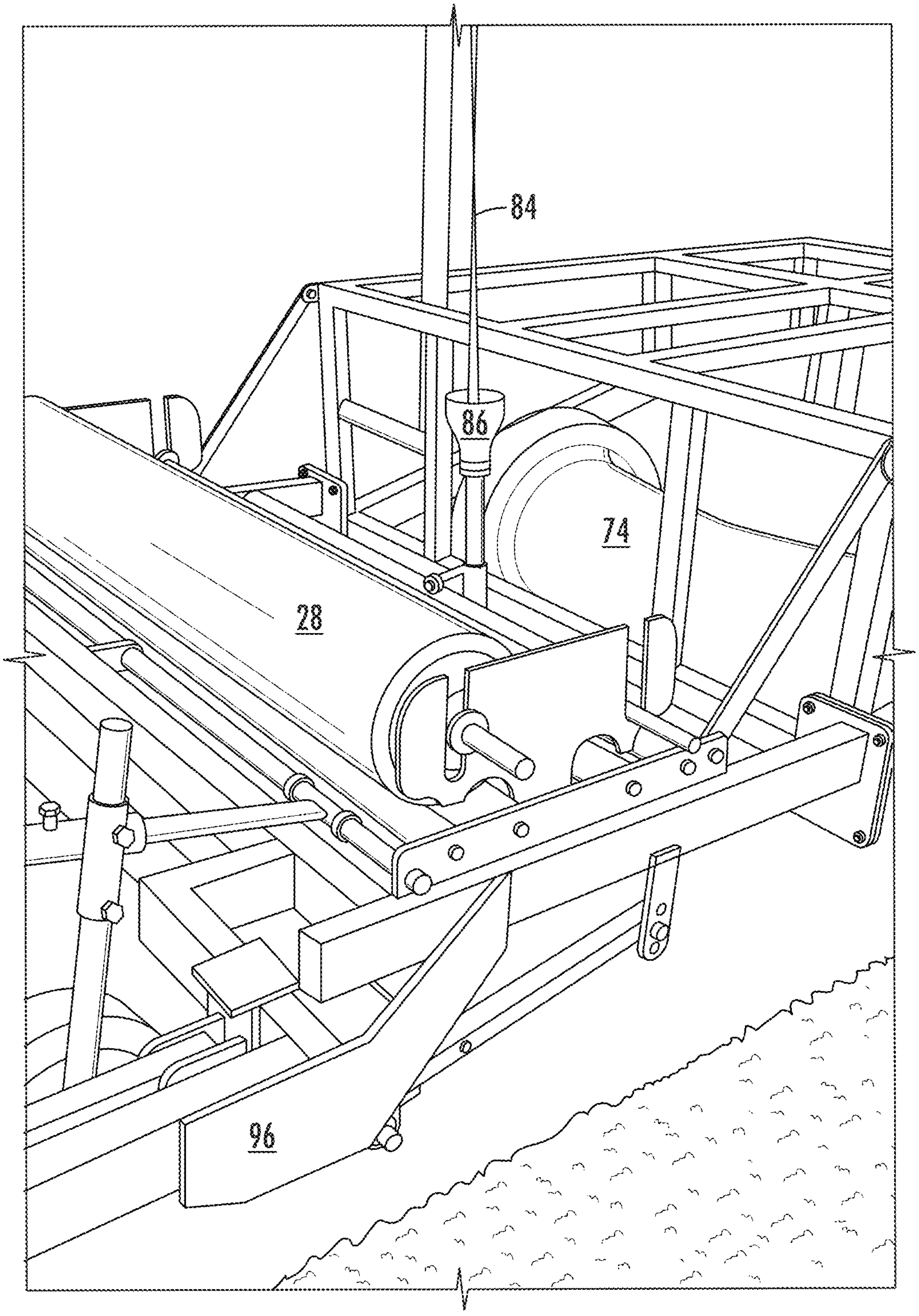
FIG. 32 is a partial side perspective view illustrating placement of the upper bedding sheet over the shaped plant bed.
Figure 33:
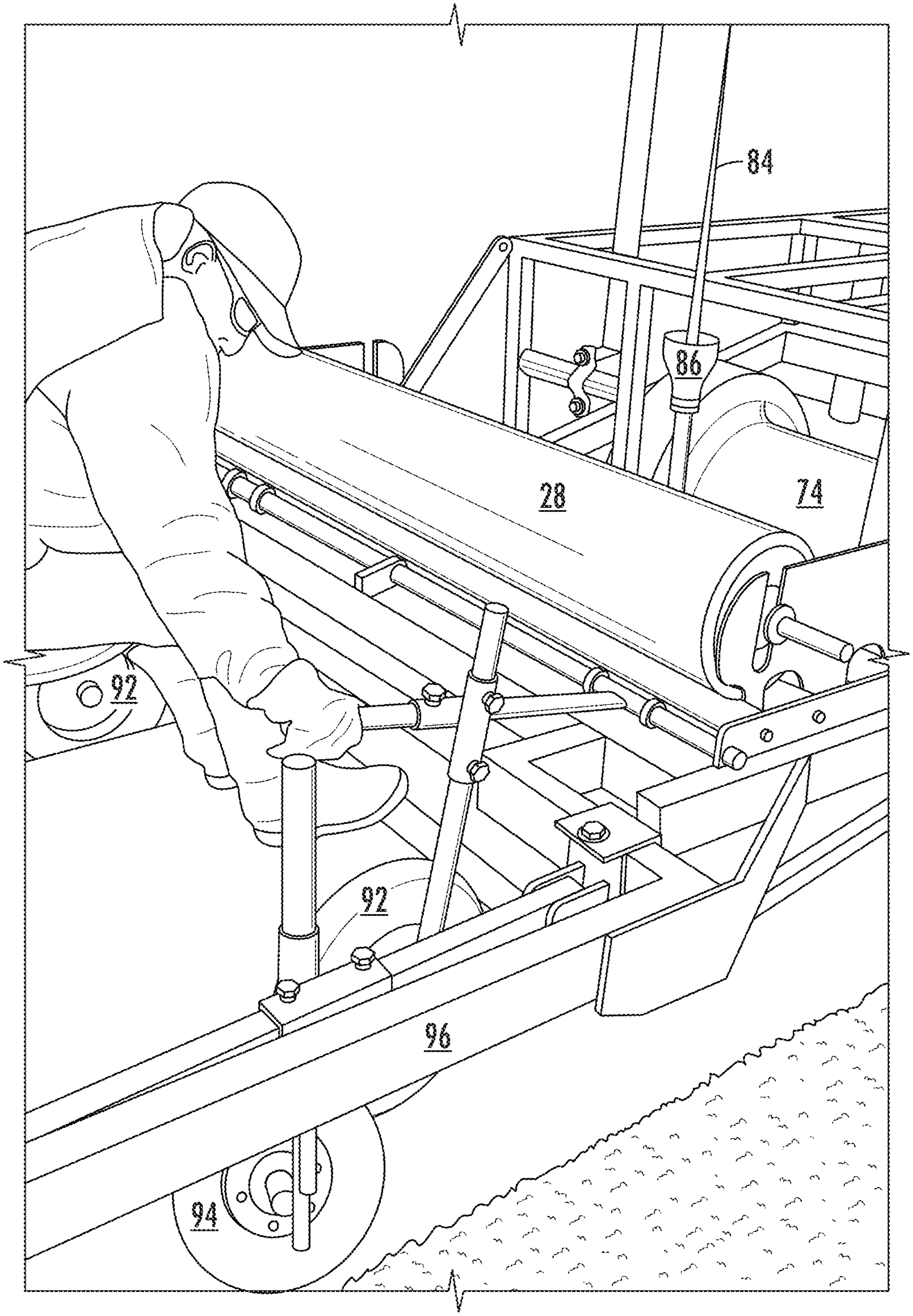
FIG. 33 is a partial side perspective view illustrating placement of the upper bedding sheet over the shaped plant bed.
Figure 34:
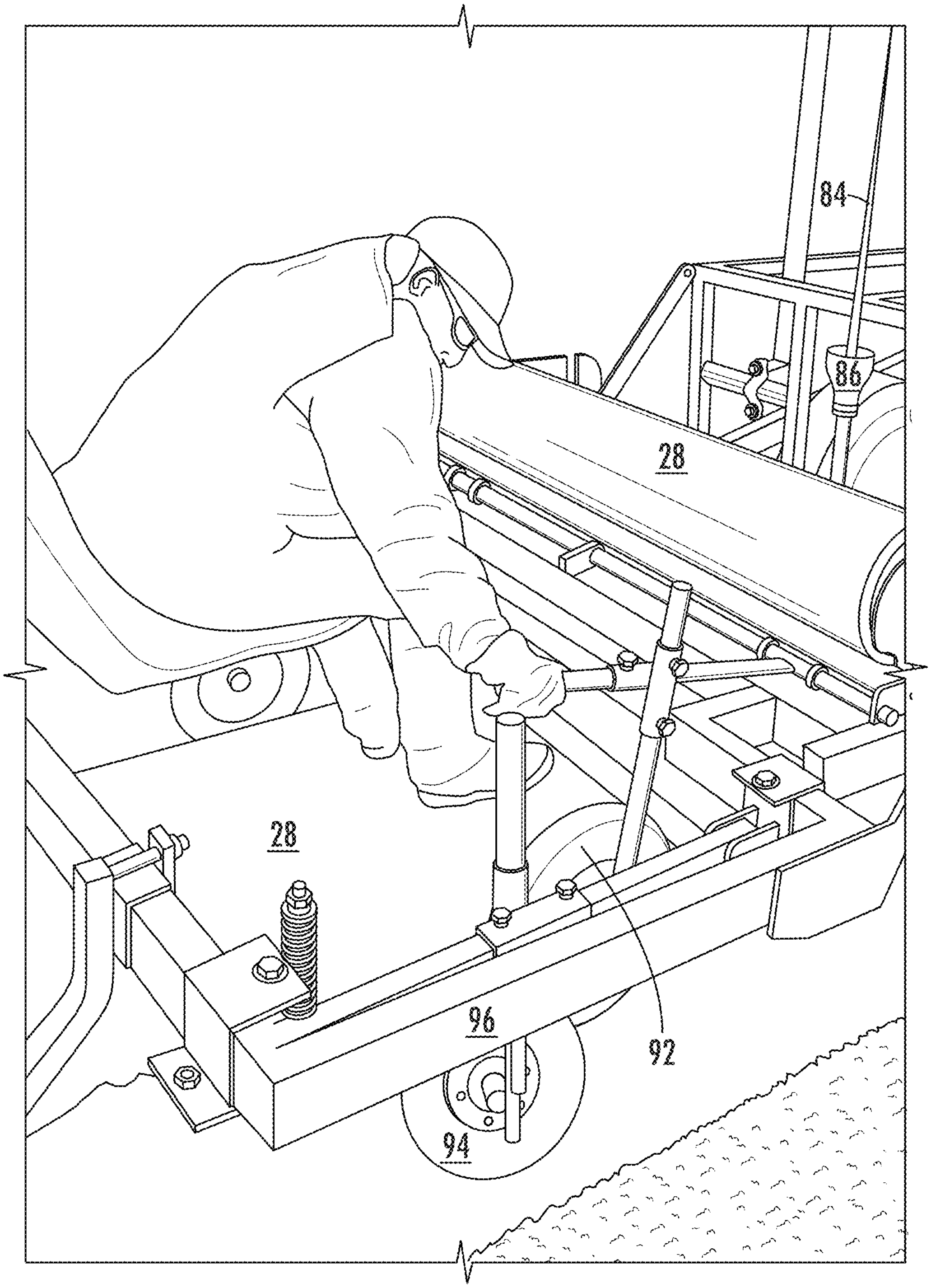
FIG. 34 is a partial side perspective view illustrating placement of the compression seal on the upper bedding sheet enclosing the shaped plant bed.
Figure 35:
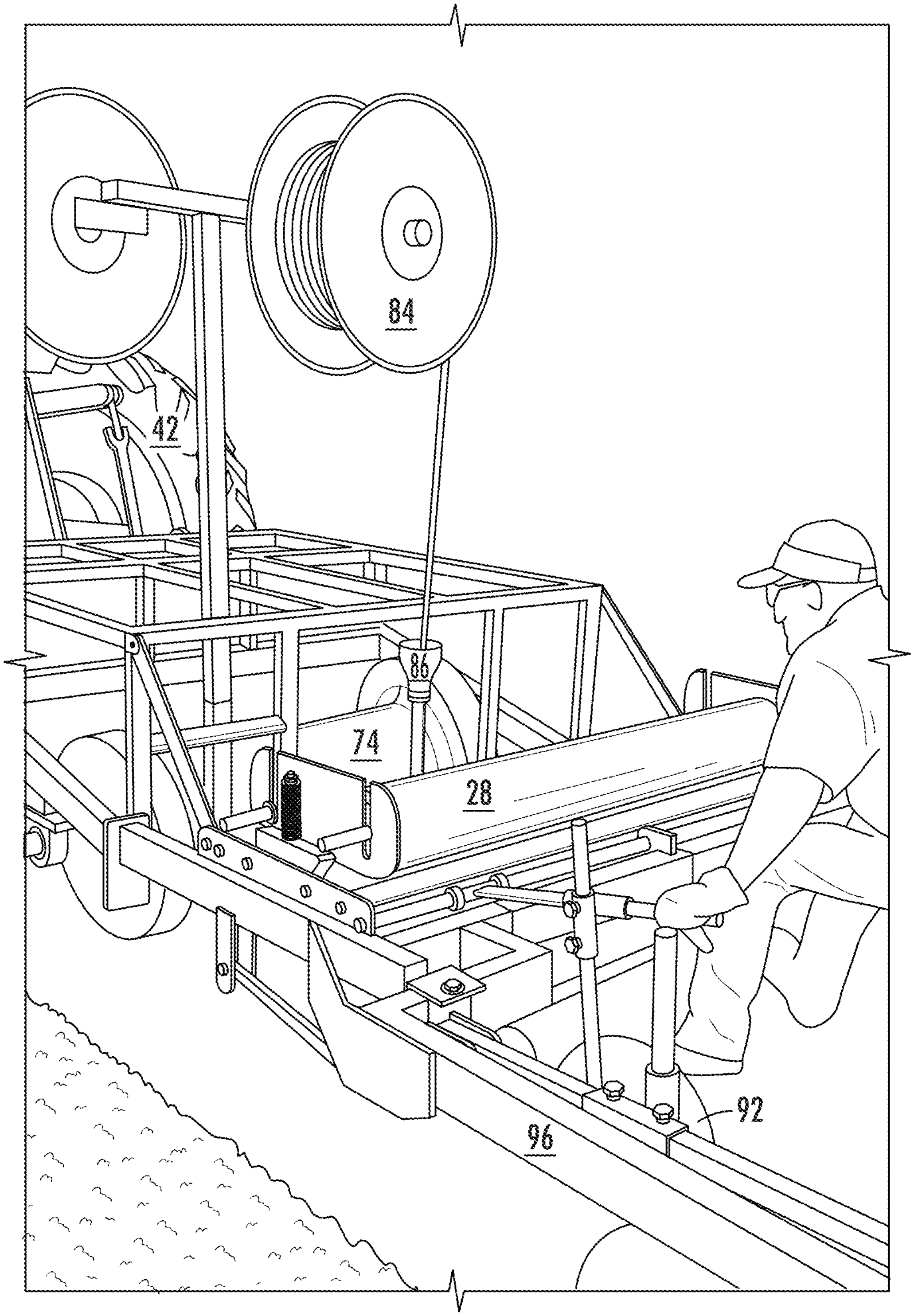
FIG. 35 is a partial side perspective view illustrating placement of the compression seal on the upper bedding sheet enclosing the shaped plant bed.
Figure 36:
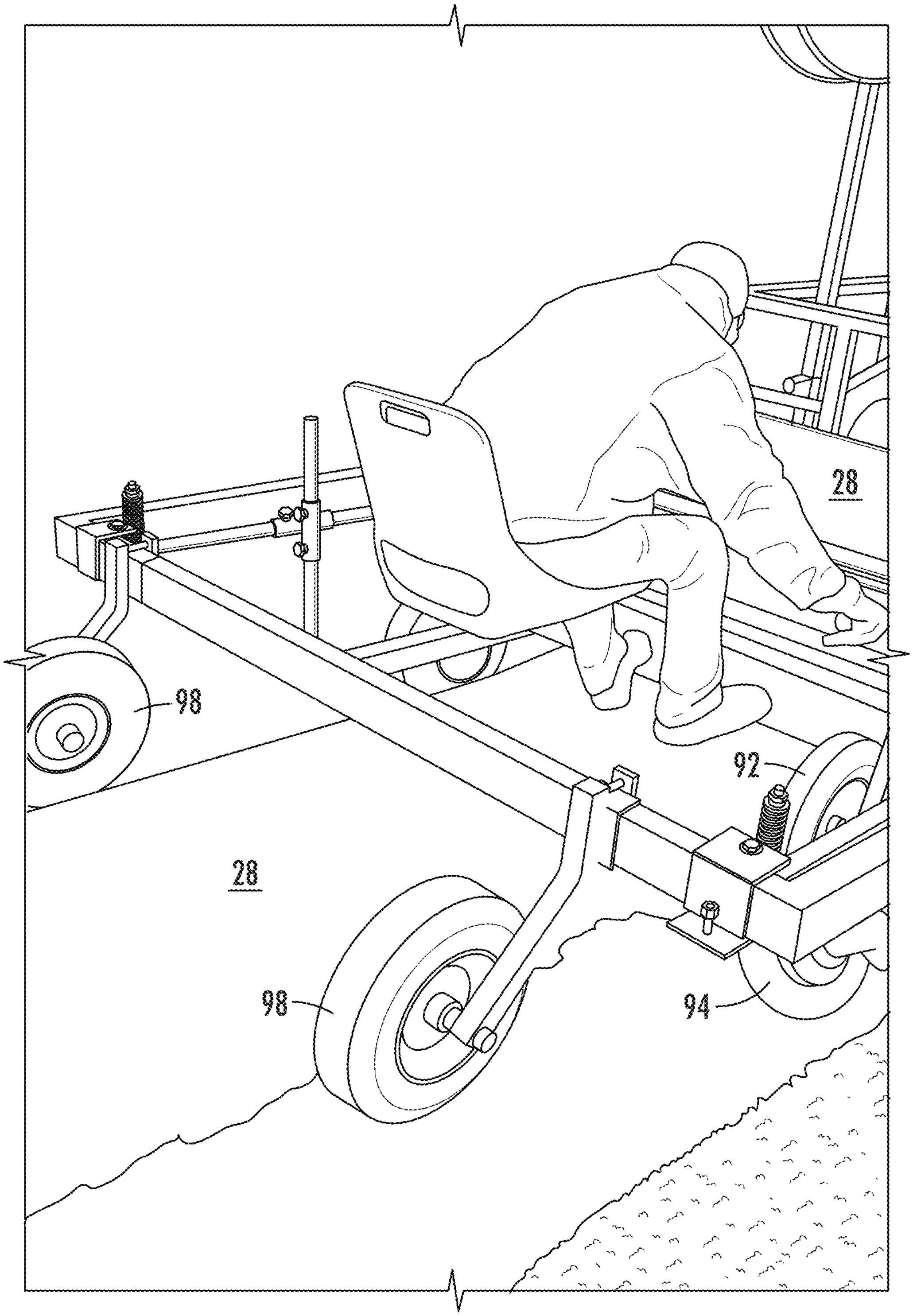
FIG. 36 is a partial side perspective view illustrating placement of the compression seal on the upper bedding sheet utilizing the compression rollers.
Figure 37:
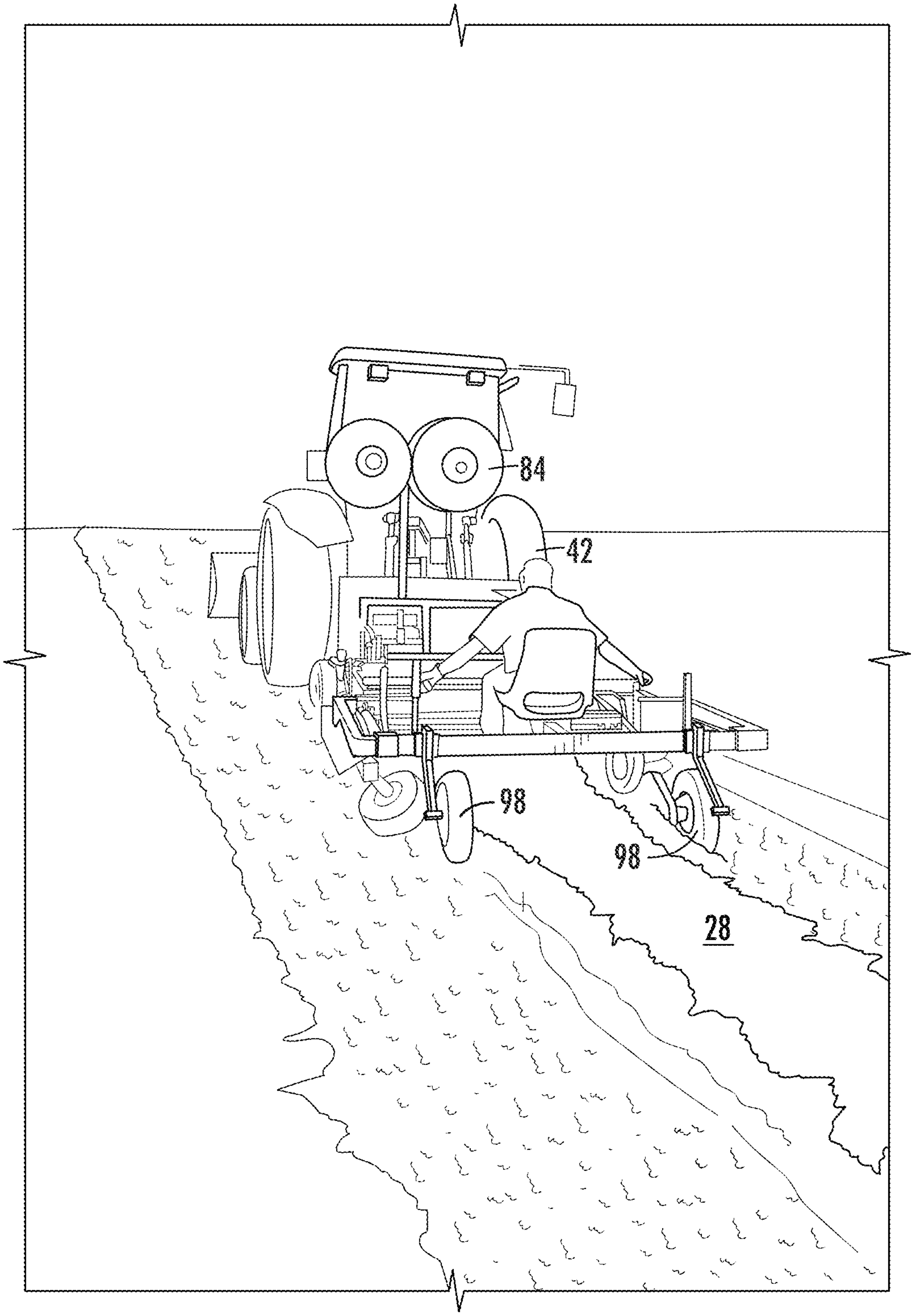
FIG. 37 is a partial side perspective view illustrating placement of the compression seal on the upper bedding sheet utilizing the compression rollers.
Figure 38:
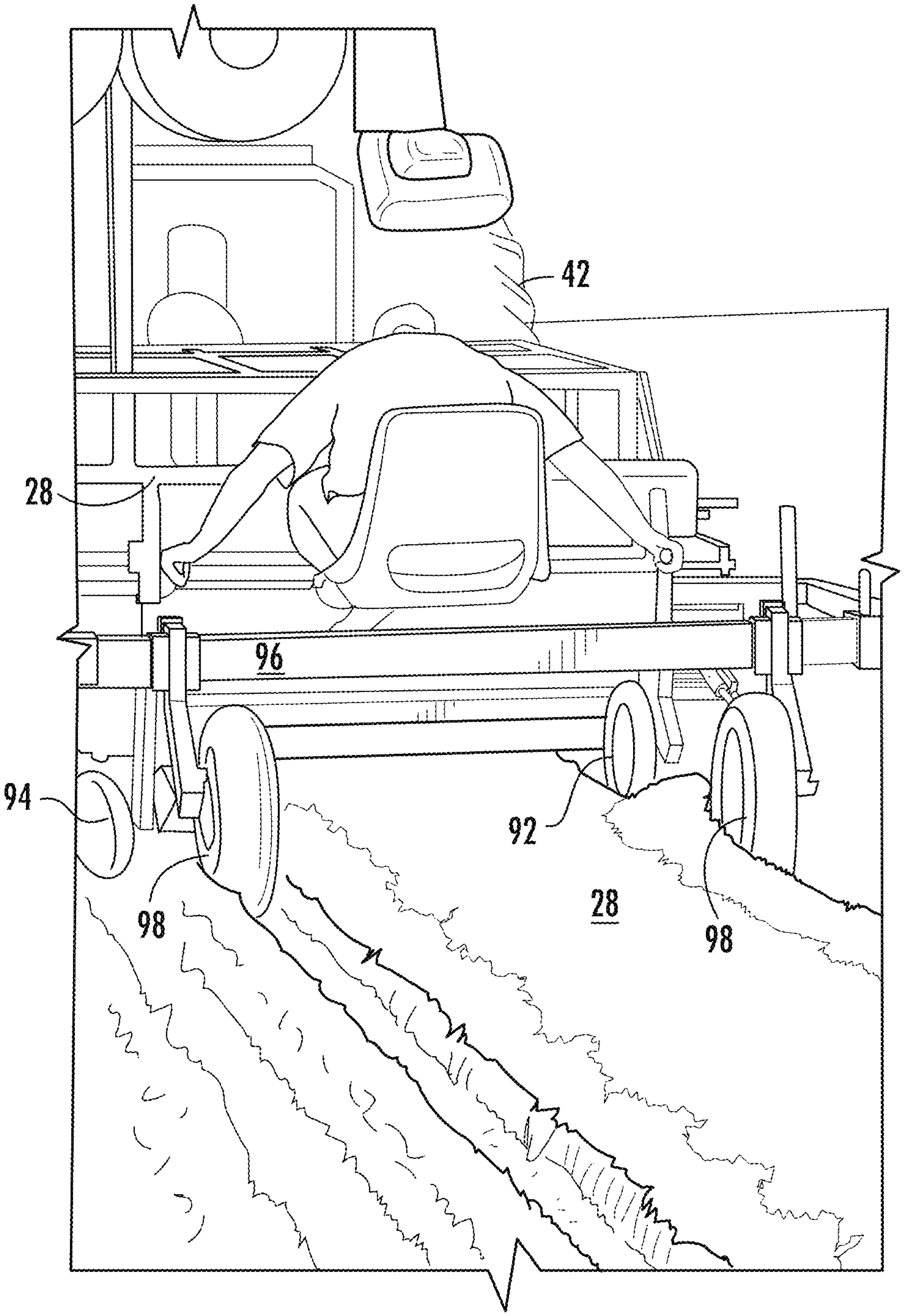
FIG. 38 is a partial side perspective view illustrating placement of the compression seal on the upper bedding sheet utilizing the compression rollers.
Figure 39:
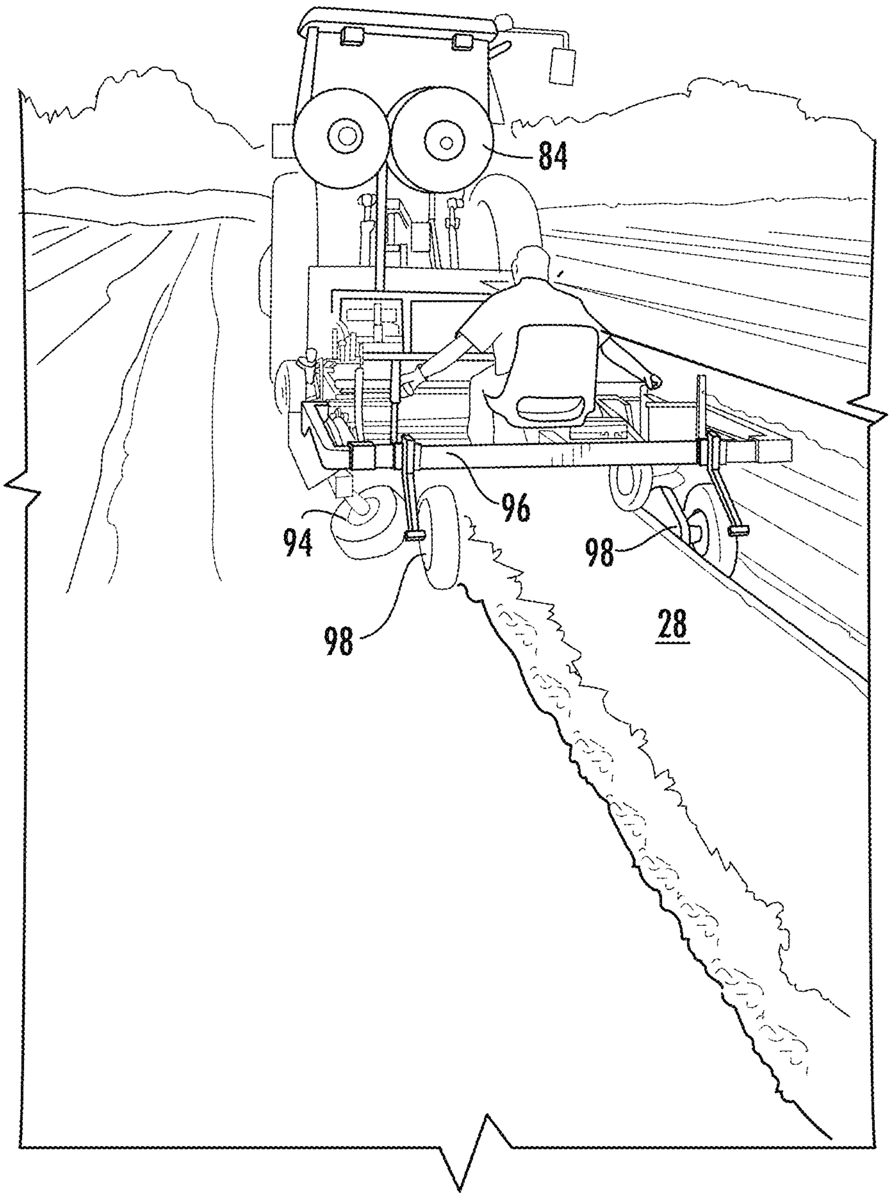
FIG. 39 is a partial rear perspective view illustrating placement of the compression seal on the upper bedding sheet utilizing the compression rollers.

Referring generally to the figures, and more specifically to FIGS. 12-39, the bed shaper 70 is illustrated. In general, the bed shaper 70 shapes the plant bed 38 on top of the first sheet 18 and places a water or drip tube 88 or tape 84, thereafter covering the plant bed 38 with a second sheet 28 and compression sealing the edges of the two sheets 18, 28 together with soil. Thus, the bed shaper 70 includes a pair of funnel blades 72 which are adjustable in angle and width to further direct soil to the form roller 74. The form roller 74 is secured to the bed shaper 70 for rotation about a central axis 76 of the form roller 74. The form roller 74 preferably includes a pair of side rolls 78 and a central roll 80. The central roll 80 is connected to the side rolls 78 with a transition roll 82. In this manner, when the form roller 74 rolls over the loose dirt piled onto the first sheet 18, the side rolls 78 establish a height to the central roll 80, thereby establishing the height of the plant bed, and the transition roll 82 determines the shape of the sides of the plant bed 38 as it determines the width. The form roller 74 is preferably constructed to have suitable weight to compress the plant bed to the desired density for the crop being grown. A roll of drip tape 84 is secured to the bed shaper 70 for free rotation. The drip tape 84 is routed through a drip tape funnel 86 and drip tape tube 88 which directs the drip tape 84 to an upper surface of the formed soil 90 (FIGS. 29-30). The second sheet 28 is secured transversely across the bed shaper 70 and mounted for free rotation. The second sheet 28 is routed downward for placement over the top surface of the formed soil 90 as the bed shaper 70 moves forward across the field. A pair of second sheet setting rollers 92 are positioned to roll over the outer portions of the second sheet 28 to position the second sheet 28 snugly against the formed soil 90 and position the outer edges of the second sheet 28 against the outer edges of the first sheet 18 to enclose the formed soil 90. A second set of resetting discs 94 are adjustably mounted to the frame 96 of the bed shaper 70 to direct depression soil 24 onto the adjacently positioned outer edges of the first and second sheets 18, 28, respectively, to provide weight to hold the edges in the adjacent position with respect to each other. A set of rotationally mounted compression rollers 98 are secured to the bed shaper frame 96 to roll over and compress the soil placed onto the outer edges of the first and second sheets 18, 28 to compressively seal the edges of the sheets. It should be noted that while not shown, the bed trencher 10 and bed shaper 70 may be pulled behind a single piece of farm equipment 42, such as a tractor, without departing from the scope of the invention. In this manner, the shaped plant bed 38 may be formed in a single pass across a field.

Still referring to FIGS. 1-40, the first and second sheet materials 18, 28 are preferably constructed from a polymer that may be biodegradable. In some embodiments, the sheet material 18, 28 is plastic sheeting of a suitable thickness to withstand weathering for at least one growing season, and may be constructed to withstand two or more growing seasons; whereby at least two sets of plant crops are grown in the elongate plant beds 38 before they must be deconstructed and reconstructed again. In at least some embodiments, the sheet material 18, 28 is coated on one side. The coating 39 may include, but should not be limited to, fertilizer(s), herbicides, pesticides and suitable combinations thereof. In this manner, the amounts of chemicals applied to the depression topsoil 24 are closely controlled, while leaching and run off are minimized by containing them inside of the shaped bed.

It is to be understood that while a certain form of the invention is illustrated, it is not to be limited to the specific form or arrangement of parts herein described and shown. It will be apparent to those skilled in the art that various changes may be made without departing from the scope of the invention, and the invention is not to be considered limited to what is shown and described in the specification.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to specific such embodiments. Indeed, various modifications of the described modes for carrying out the invention which are obvious to those skilled in the art are intended to be within the scope of the following claims.

What is claimed is:

1. A bed trencher (10) for constructing an encapsulated plant bed (38) across a field comprising:

the bed trencher (10) including a frame (62) for positioning bed trencher components such that they may be pulled by a piece of farm equipment (42), a splitter (44) secured at a front portion of the frame (62) for breaking a topsoil (16) surface and directing it to a pair of splitter blades (46), the splitter blades (46) being constructed and arranged to widen the area of the broken topsoil (16) and direct it outwardly with respect to a longitudinal centerline of the bed trencher (10), creating an elongated depression (12) as the frame (62) is moved forward by the farm equipment (42) causing the topsoil (16) to be moved out of the depression (12) and piled along both sides of the depression (12); a roll of first sheet material (18), is mounted to the frame (62) for free rotation at a position on the frame (62) that is generally rearward of a rear portion (56) of the splitter blades (46), roller guides are provided to route the sheet material (18) downwardly to the depression (12), the first roll of sheet material having a suitable width to cover the depression (12), including a pair of side walls (14) such that the sheet material (18) extends outwardly beyond the distal edges of the depression (12), a first pair of resetting discs (60) are secured to the frame (62) and positioned to redistribute the topsoil displaced from forming the depression (12) back onto the first sheet (18), so that the topsoil (16) is distributed on the first sheet (18) in a preform shape, a bed shaper (70), including a bed shaper frame (96) for positioning bed shaper components such that they may be pulled by a piece of farm equipment (42) for passing the bed shaper over the preform shape, a form roller (74) being secured to the bed shaper frame (96) for rotation about a central axis (76) of the form roller (74) to compress the preform shape to a desired density while reshaping the preform shape to a formed soil (90) bed shape, a roll of drip tape (84) is secured to the bed shaper frame (96) for free rotation, a drip tape funnel (86) and drip tape tube (88) are secured to the bed shaper frame (96) for directing the drip tape (84) to an upper surface of the formed soil (90), a roll of second sheet material (28) is secured transversely across the bed shaper frame (96) and mounted for free rotation; guides are secured to the bed shaper frame (96) for routing the second sheet (28) downward for placement over a top surface of the formed soil (90) and the drip tape tube (88) as the bed shaper (70) is moved forward, a pair of second sheet setting rollers (92) are positioned on the frame (62) to roll over the outer portions of the second sheet (28) to position the second sheet (28) against the formed soil (90) and position a pair of outer edges of the second sheet (28) in an overlapping relationship with respect to the outer edges of the first sheet (18) to enclose the formed soil (90).

2. The bed trencher (10) for constructing an encapsulated plant bed (38) across a field of claim 1 wherein the form roller (74) includes a pair of side rolls (78) and a central roll (80), wherein the side rolls (78) establish a height to the central roll (80), thereby establishing the height of the formed soil (90) and wherein the side rolls (78) determine a width of the formed soil (90).

3. The bed trencher (10) for constructing an encapsulated plant bed (38) across a field of claim 2 wherein the central roll (80) is connected to the side rolls (78) with a transition roll (82), wherein the transition roll (82) determines a shape of the sides of the formed soil (90).

4. The bed trencher (10) for constructing an encapsulated plant bed (38) across a field of claim 2 wherein a form roller (74) weight is selected to provide a predetermined compaction density to the formed soil (90).

5. The bed trencher (10) for constructing encapsulated plant bed (38) across a field of claim 2 wherein a second set of resetting discs (94) are adjustably mounted to the bed shaper frame (96) to direct topsoil (16) onto the overlapping outer edges of the first and second sheets (18), (28), respectively, to provide weight to hold the edges in the overlapping position with respect to each other.

6. The bed trencher (10) for constructing an encapsulated plant bed (38) across a field of claim 2 wherein a pair of first sheet rollers (58) are positioned rearward of the splitter blades (46) and prior to the resetting discs (60) to force the first sheet (18) into corners of the depression (12) formed by the pair of side walls (14) and a depression base surface (15).

7. The bed trencher (10) for constructing an encapsulated plant bed (38) across a field of claim 6 wherein the first sheet rollers (58) include an adjustable width which allows them to be positioned to push the first sheet (18) downward and/or outward to position the first sheet (18) properly in the depression (12) as the bed trencher (10) moves forward.

8. The bed trencher (10) for constructing an encapsulated plant bed (38) across a field of claim 6 wherein the bed trencher (10) and the bed shaper (70) are connected one behind the other to be pulled behind a single piece of farm equipment (42), wherein the encapsulated plant bed (38) may be formed in a single pass across a field.

9. The bed trencher (10) for constructing an encapsulated plant bed (38) across a field of claim 1 wherein the bed shaper (70) includes a pair of funnel blades (72) which are adjustable in angle and width to further direct soil to the form roller (74).

10. The bed trencher (10) for constructing an encapsulated plant bed (38) across a field of claim 1 wherein the resetting discs (60) are adjustable in angle and tilt to allow the soil to be distributed on the first sheet (18) in a preform to create a desired final formed soil (90) for the plant bed (38).

11. The bed trencher (10) for constructing an encapsulated plant bed (38) across a field of claim 1 wherein the bed trencher (10) includes more than one resetting disc (60) positioned on each side of the bed trencher (10) to form the preform shape closer to the formed soil (90).

12. The bed trencher (10) for constructing an encapsulated plant bed (38) across a field of claim 1 wherein the bed shaper (70) includes a pair of funnel blades (72) which are adjustable in angle and width to further direct soil to the form roller (74).

13. The bed trencher (10) for constructing an encapsulated plant bed (38) across a field of claim 1 wherein the splitter (44) is generally V-shaped when viewed from the top, having a forwardmost point splitter (48) which lowers a force required to break the topsoil (16).

14. The bed trencher (10) for constructing an encapsulated plant bed (38) across a field of claim 13 wherein a rear portion (50) of the splitter (44) includes a pair of hinges (52) which connect the splitter (44) to a forward end (54) of the splitter blades (46) for adjusting the splitter blade to alter a width of the depression and the topsoil available to form the formed soil (90).

15. The bed trencher (10) for constructing an encapsulated plant bed (38) across a field of claim 1 wherein the farm equipment (42) is a tractor.

* * * * *